(12) United States Patent
Kolar et al.

(10) Patent No.: US 6,250,601 B1
(45) Date of Patent: Jun. 26, 2001

(54) ADVANCED TOUCHLESS PLUMBING SYSTEMS

(75) Inventors: Anton J. Kolar, Sheboygan; Andrew J. Paese, Plymouth; David J. Richter-O'Connell, Sheboygan; Steven M. Tervo, Plymouth; Carter J. Thomas, Cedarburg, all of WI (US); William R. Burnett; David C. Shafer, both of Menlo park, CA (US); Fred Judson Heinzmann, Los Altos, CA (US)

(73) Assignee: Kohler Company, Kohler, WI (US)

( * ) Notice: Subject to any disclaimer, the term of this patent is extended or adjusted under 35 U.S.C. 154(b) by 0 days.

(21) Appl. No.: 09/118,461

(22) Filed: Jul. 17, 1998

Related U.S. Application Data

(60) Provisional application No. 60/052,963, filed on Jul. 18, 1997, provisional application No. 60/052,960, filed on Jul. 18, 1997, provisional application No. 60/053,245, filed on Jul. 18, 1997, and provisional application No. 60/053,168, filed on Jul. 18, 1997.

(51) Int. Cl.$^7$ .................................. E03C 1/05; E03D 5/10
(52) U.S. Cl. ............................................ 251/129.04; 4/623
(58) Field of Search ............................ 251/129.04; 4/623

(56) References Cited

U.S. PATENT DOCUMENTS

| | | |
|---|---|---|
| 2,709,918 | 6/1955 | Yetter . |
| 3,394,589 | 7/1968 | Tomioka . |
| 3,686,669 | 8/1972 | Toulis . |
| 3,796,208 | 3/1974 | Bloice . |
| 3,832,900 | 9/1974 | Ross . |
| 3,895,383 | 7/1975 | Korman . |
| 3,932,871 | 1/1976 | Foote . |
| 3,995,212 | 11/1976 | Ross . |
| 4,023,154 | 5/1977 | Comeaux . |
| 4,072,941 | 2/1978 | Hamid et al. . |
| 4,125,835 | 11/1978 | Barry . |
| 4,134,163 | 1/1979 | Matsunaga . |
| 4,135,397 | 1/1979 | Krake . |
| 4,141,091 | 2/1979 | Pulvari . |

(List continued on next page.)

FOREIGN PATENT DOCUMENTS

| | | |
|---|---|---|
| 28 53 981 | 6/1980 | (DE) . |
| 30 08 025 | 9/1981 | (DE) . |
| 39 20 581 | 1/1991 | (DE) . |
| 0 353 183 A1 | 1/1990 | (EP) . |
| 0 628 666 A2 | 12/1994 | (EP) . |
| 5703 * | 2/1970 | (JP) ................................. 251/129.04 |
| WO 91/13370 | 9/1991 | (WO) . |

OTHER PUBLICATIONS

"A Probing Look At Emerging Technologies and the Strategic Markets They Create", *Futuretech*, 175:1–13 (Jul. 1994).

Stover, D., "Radar on a Chip, 101 Uses in Your Life", *Popular Science*, 6 pgs. (Mar. 1995).

*Primary Examiner*—John Rivell
(74) *Attorney, Agent, or Firm*—Merchant & Gould P.C.

(57) ABSTRACT

The present invention is a system for controlling a plumbing fixture. The system includes at least two sensors, each sensor including a receiver, and a controller coupled to receive detection signals from the sensors and to generate a control signal in response to the received signals. An actuator is coupled to receive the control signal from the controller and couplable to the plumbing device to act on the bathroom device. The invention is also a method of controlling plumbing fixtures that includes receiving detection signals from a plurality of sensors in a central controller, selecting, in the central controller, which of a plurality of actuators attachable to the plumbing fixtures to operate and directing control signals to the selected actuator to operate the selected actuator.

48 Claims, 26 Drawing Sheets

U.S. PATENT DOCUMENTS

| | | |
|---|---|---|
| 4,153,366 | 5/1979 | Mamon et al. . |
| 4,328,487 | 5/1982 | Cheal . |
| 4,358,759 | 11/1982 | Stewart et al. . |
| 4,402,095 | 9/1983 | Pepper . |
| 4,419,659 | 12/1983 | Harman et al. . |
| 4,433,328 | 2/1984 | Saphir et al. . |
| 4,489,601 | 12/1984 | Rao et al. . |
| 4,543,580 | 9/1985 | Bent et al. . |
| 4,567,484 | 1/1986 | Schilz et al. . |
| 4,621,264 | 11/1986 | Yashiro et al. . |
| 4,642,641 | 2/1987 | Campbell . |
| 4,651,152 | 3/1987 | Harmuth . |
| 4,667,350 | 5/1987 | Ikenaga et al. . |
| 4,673,935 | 6/1987 | Spencer . |
| 4,677,438 | 6/1987 | Michiguchi et al. . |
| 4,697,184 | 9/1987 | Cheal et al. . |
| 4,707,867 | 11/1987 | Kawabe et al. . |
| 4,716,605 | 1/1988 | Shepherd et al. . |
| 4,742,583 | 5/1988 | Yoshida et al. . |
| 4,743,906 | 5/1988 | Fullerton . |
| 4,756,031 | 7/1988 | Barrett . |
| 4,767,922 | 8/1988 | Stauffer . |
| 4,797,621 | 1/1989 | Anderson et al. . |
| 4,883,749 | 11/1989 | Roberts et al. . |
| 4,891,649 | 1/1990 | Labaar et al. . |
| 4,914,758 * | 4/1990 | Shaw ................................... 4/623 X |
| 4,916,455 | 4/1990 | Bent et al. . |
| 4,921,211 | 5/1990 | Novak et al. . |
| 4,949,074 | 8/1990 | D'Ambrosia et al. . |
| 4,952,939 | 8/1990 | Seed . |
| 4,975,703 | 12/1990 | Delisle et al. . |
| 4,979,186 | 12/1990 | Fullerton . |
| 4,981,158 * | 1/1991 | Brondolino et al. ........ 251/129.04 X |
| 4,998,673 | 3/1991 | Pilolla . |
| 5,025,516 | 6/1991 | Wilson . |
| 5,030,956 | 7/1991 | Murphy . |
| 5,031,258 | 7/1991 | Shaw . |
| 5,043,705 | 8/1991 | Rooz et al. . |
| 5,148,175 | 9/1992 | Woolfolk . |
| 5,150,123 | 9/1992 | Orlowski et al. . |
| 5,150,126 | 9/1992 | Knepper et al. . |
| 5,187,816 | 2/1993 | Chiou . |
| 5,187,818 | 2/1993 | Barrett, Sr. et al. . |
| 5,199,118 | 4/1993 | Cole et al. . |
| 5,201,906 | 4/1993 | Schwarz et al. . |
| 5,217,035 | 6/1993 | Van Marcke . |
| 5,224,685 | 7/1993 | Chiang et al. . |
| 5,226,629 * | 7/1993 | Millman et al. ................. 251/129.04 |
| 5,227,797 | 7/1993 | Murphy . |
| 5,227,799 | 7/1993 | Kimura et al. . |
| 5,243,717 | 9/1993 | Yasuo . |
| 5,249,463 | 10/1993 | Willson et al. . |
| 5,278,567 | 1/1994 | Nourrcier . |
| 5,311,189 | 5/1994 | Nagel . |
| 5,345,471 | 9/1994 | McEwan . |
| 5,361,070 | 11/1994 | McEwan . |
| 5,363,108 | 11/1994 | Fullerton . |
| 5,369,818 | 12/1994 | Barnum et al. . |
| 5,384,541 | 1/1995 | Chu et al. . |
| 5,455,564 | 10/1995 | Hsiao . |
| 5,457,394 | 10/1995 | McEwan . |
| 5,460,210 | 10/1995 | Koeninger . |
| 5,465,094 | 11/1995 | McEwan . |
| 5,471,198 | 11/1995 | Newham . |
| 5,473,311 | 12/1995 | Hoseit . |
| 5,482,250 | 1/1996 | Kodaira . |
| 5,504,490 | 4/1996 | Brendle et al. . |
| 5,504,950 | 4/1996 | Natalizia et al. . |
| 5,508,510 | 4/1996 | Laverty, Jr. et al. . |
| 5,510,800 | 4/1996 | McEwan . |
| 5,512,834 | 4/1996 | McEwan . |
| 5,517,198 | 5/1996 | McEwan . |
| 5,519,400 | 5/1996 | McEwan . |
| 5,521,600 | 5/1996 | McEwan . |
| 5,523,760 | 6/1996 | McEwan . |
| 5,541,605 | 7/1996 | Heger . |
| 5,543,799 | 8/1996 | Heger . |
| 5,563,605 | 10/1996 | McEwan . |
| 5,570,869 | 11/1996 | Diaz et al. . |
| 5,573,012 | 11/1996 | McEwan . |
| 5,576,627 | 11/1996 | McEwan . |
| 5,581,256 | 12/1996 | McEwan . |
| 5,589,838 | 12/1996 | McEwan . |
| 5,594,449 | 1/1997 | Otto . |
| 5,609,059 | 3/1997 | McEwan . |
| 5,610,589 | 3/1997 | Evans et al. . |
| 5,610,611 | 3/1997 | McEwan . |
| 5,611,093 | 3/1997 | Barnum et al. . |
| 5,625,908 | 5/1997 | Shaw . |
| 5,630,216 | 5/1997 | McEwan . |
| 5,661,385 | 8/1997 | McEwan . |
| 5,661,490 | 8/1997 | McEwan . |
| 5,682,164 | 10/1997 | McEwan . |
| 5,694,653 * | 12/1997 | Harald ...................... 4/623 |
| 5,754,144 | 5/1998 | McEwan . |
| 5,757,320 | 5/1998 | McEwan . |
| 5,766,208 | 6/1998 | McEwan . |
| 5,767,953 | 6/1998 | McEwan . |
| 5,774,091 | 6/1998 | McEwan . |

* cited by examiner

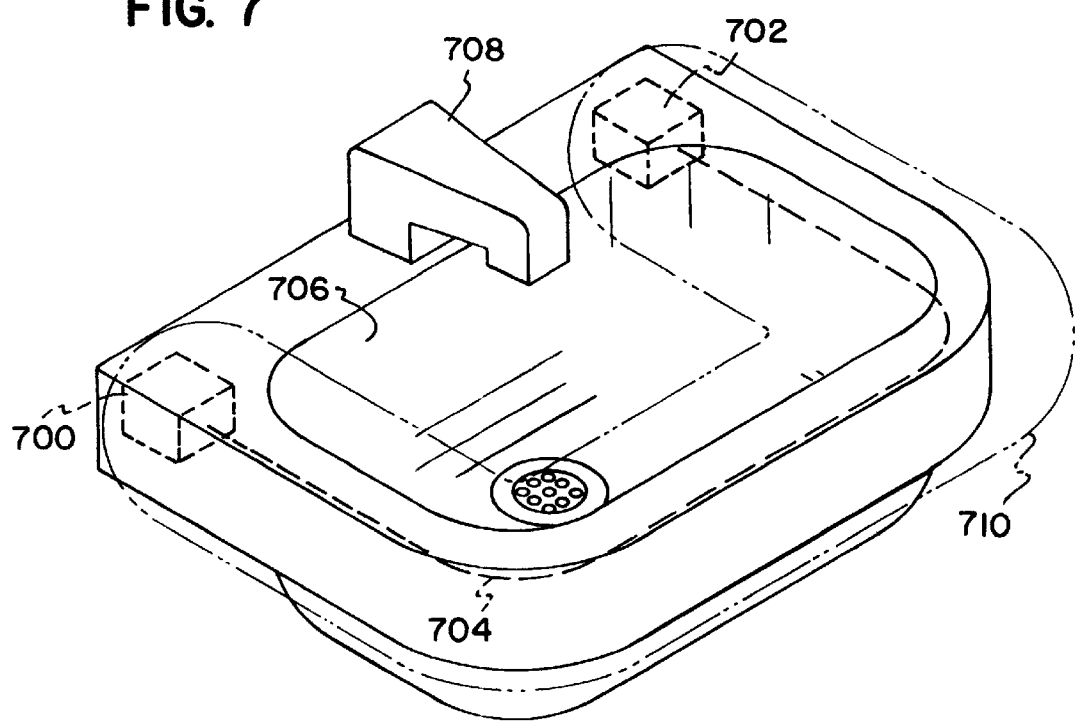

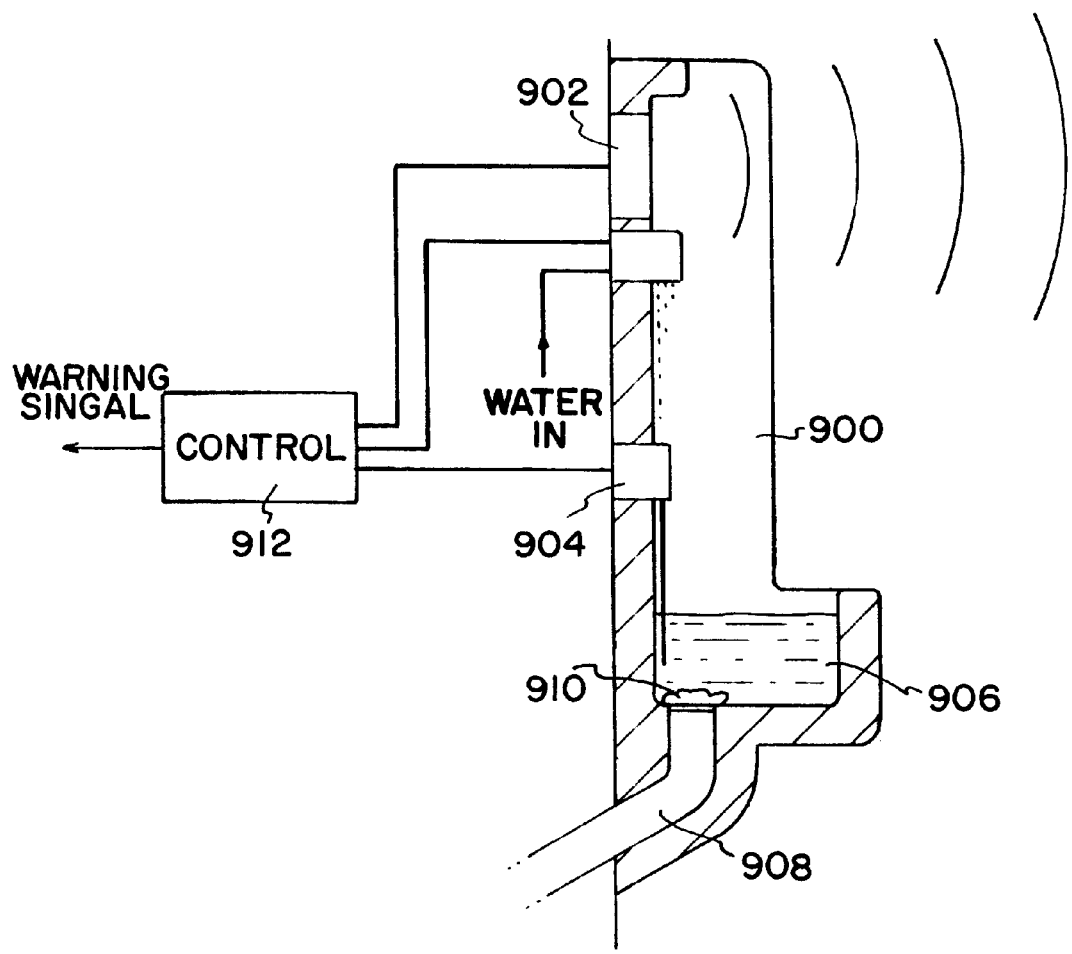

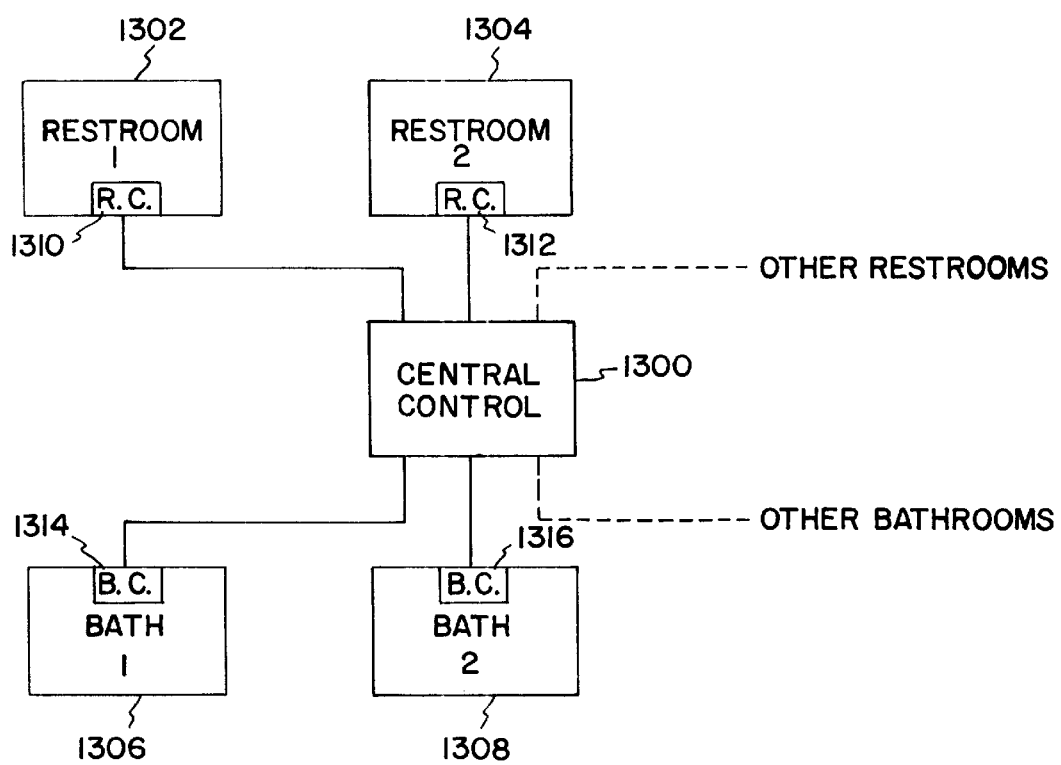

ADVANCED TOUCHLESS PLUMBING SYSTEMS

The present application is related to U.S. provisional application No. 60/053,245, filed Jul. 18, 1997, entitled "Radar Fluid Level Sensor" and U.S. provisional application No. 60/052,960, filed Jul. 18, 1997, entitled "Devices Utilizing Radar Detection of a User for Initiating Fluid Flow," U.S. provisional application No. 60/053,168, filed Jul. 18, 1997, entitled "Radar Detector Using Leaky Transmission Line" and U.S. provisional application No. 60/052,963, filed Jul. 18, 1997, entitled "Advanced Touchless Plumbing Systems", all of which are incorporated herein by reference.

BACKGROUND OF THE INVENTION

This application relates to automated touchless plumbing facilities, and particularly to washrooms, bathrooms and kitchens that have active sensors to sense a user's position and movement, to sense fluid levels within a fixture, and to control the facilities.

Washroom facilities, including bathrooms in private dwellings and restrooms in commercial buildings, have the potential for accumulating high concentrations of bacteria. For example, high concentrations of bacteria are commonly found on toilet flush controls, faucet handles, toilet seats, floors, and entry and exit doors. There is a strong desire to develop touchless toilet facilities so that the user can avoid touching contaminated surfaces. Consequently, it is desirable to develop control systems that detect a user's, or multiple users', actions or movements, so that the various fixtures and equipment in the washroom can be controlled automatically and without the user having to physically touch a contaminated surface.

Moreover, it is desirable that the user's health and safety be maximized, while the costs, and intrusion to the washroom environment by the control system, are reduced.

Kitchen facilities, particularly commercial kitchens, are other areas where touchless plumbing fixtures are useful. For example, a kitchen staff member may use a touchless faucet after handling raw meat, thus avoiding the need to touch a faucet handle before starting the flow of water, or the need for the user to remember to remove gloves before touching the faucet handle.

There is, therefore, a need for improved plumbing fixtures that operate without the requirement that the user physically touch the appliance, and that provide increased health and safety for the user.

SUMMARY OF THE INVENTION

In order to reduce the problems described above, the present invention is directed to a system for controlling a plumbing fixture. The system includes at least two sensors, each sensor including a receiver, and a controller coupled to receive detection signals from the sensors and to generate a control signal in response to the received signals. An actuator is coupled to receive the control signal from the controller and couplable to the plumbing device to act on the bathroom device.

In certain embodiments, the sensors form a multi-sensor array, wherein each sensor in the multi-sensor array is oriented to detect objects within a respective detection zone, and the sensors are coupled to the controller to transmit detection information thereto. IN other embodiments, the controller is adapted to detect a user passing from one detection zone to the another and also to detect a height of the user.

The invention is also directed to a method of controlling plumbing fixtures that includes receiving detection signals from a plurality of sensors in a central controller, selecting, in the central controller, which of a plurality of actuators attachable to the plumbing fixtures to operate and directing control signals to the selected actuator to operate the selected actuator.

In some embodiments, the method invention further includes detecting the presence of an object within a detection zone of a sensor in a multi-sensor array and receiving detection signals from a plurality of sensors in the multi-sensor array. This may include detecting the object moving from one detection zone to another detection zone, or may include sensing a range between the object and one of the sensors of the plurality of sensors and determining a height of the object from the sensed range.

The invention is further directed to a system for controlling plumbing fixtures that includes means for receiving detection signals from a plurality of sensors, means for selecting which of a plurality of actuators attachable to the plumbing fixtures to operate and means for directing control signals to the selected actuator to operate the selected actuator.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 7 illustrates a leaky transmission line antenna;

FIG. 9 illustrates a user sensor and a fluid level sensor used in combination in a urinal;

FIG. 13 illustrates a control architecture for controlling a number of restrooms and bathrooms;

Figure 1A:
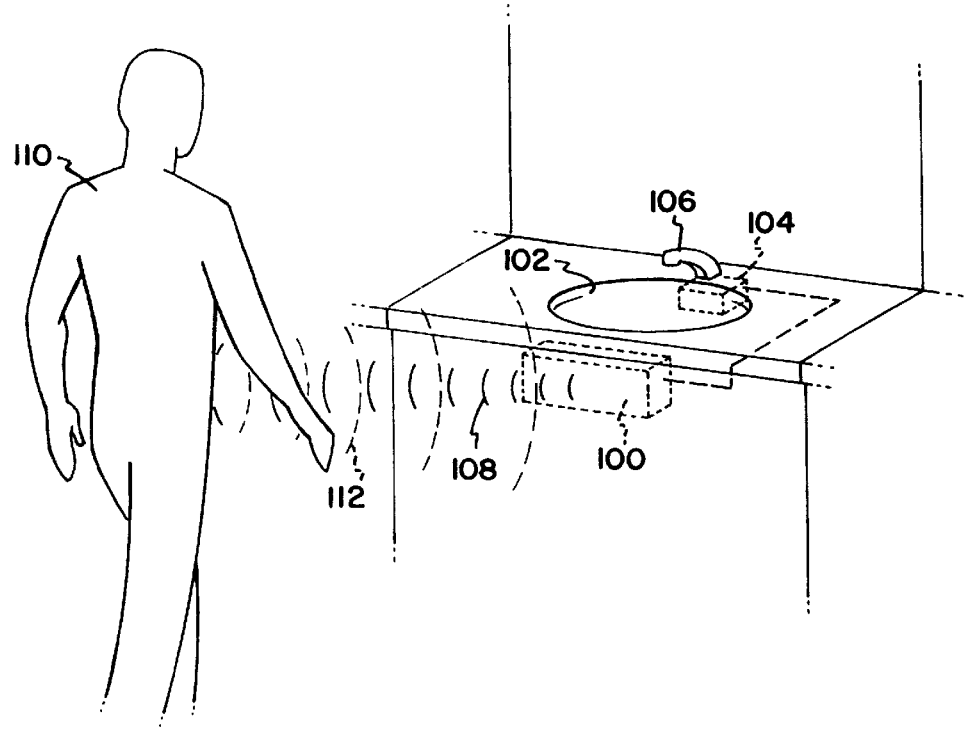
FIG. 1A illustrates an embodiment of the invention, with a user approaching a wash basin with an active sensor.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

The present invention is directed to providing a system that controls the touchless operation of plumbing fixtures in, for example, washrooms, bathrooms and kitchens. The system improves the safety, health and comfort of the user.

The control systems for controlling washroom and kitchen facilities and for providing the services described hereinbelow are based on the use of one or more sensing devices for detecting the presence, motion, and behavior of a user in the facility. Although most of the applications disclosed hereinbelow are described in a washroom environment, this is not a limiting description and many of the applications are also useful in a kitchen environment, particularly those applications directed to the control of a faucet.

Where the controllers are based on a microprocessor, various software algorithms may be implemented that use signal detection and statistical techniques to resolve signal-to-noise problems caused by spurious reflections and background clutter in order to reduce the incidence of false triggering.

Consider the illustration in FIG. 1A which is an example of an active sensor controlling a washroom device, in this case the faucet in a wash basin. The active sensor 100 is located close to the wash basin 102 and is connected to a control valve, or control valves 104 that supply water to the faucet 106. The active sensor 100 transmits a probe beam 108, illustrated as solid wave fronts. The probe beam 108 reflects from a user 110 to generate a reflected beam 112 (dashed wavefronts) that is detected by the active sensor 100. When the active sensor 100 determines that the user 110 is approaching sufficiently closely to the wash basin 102, a determination is made that the user 110 intends using the wash basin 102, and a control signal is transmitted to the valve 104 to commence the flow of water through the faucet 106.

Once the user 110 has finished at the wash basin 102, the active sensor 100 determines that the user 110 has moved away from the wash basin 102, then the valve 104 is closed to end the flow of water into the wash basin 102.

The active sensor 100 may take on different forms. For example, the active sensor 100 may be one of various applicable forms of radar, typically transmitting signals having a frequency ranging from 1 GHz to 100 GHz. The active sensor may also be an IR or visible active sensor, using incoherent or coherent light.

An active sensor may be used for controlling other items typically found in a washroom or bathroom, such as the flushing valve of a toilet or urinal, the water supply to a shower head, and an air-dryer for drying hands after washing. Additionally, fluid levels in, for example, a bathtub, whirlpool, or urinal can be detected by active fluid level sensors.

The information generated by active sensors concerning a user's movements, positions, and actions, information on fluid levels and other information as is described hereinbelow may be further processed and applied to systems for increasing the safety and comfort of the user, reducing the risk of exposure to bacteria and disease, as well as making the restroom easier to use.

Several different types of sensor technology are applicable to sensing in restrooms and bathrooms. These include radar, light based devices, including laser radar, and ultrasonic sensors. Although the following description is written primarily in the context of radar-based sensors, this is not to be understood as a limitation to the invention, but is provided as an example. Other types of sensors, as described above are also applicable to the invention.

Radar sensors are typically operated in confined settings, such as is found in a restroom, bathroom or kitchen, at frequencies ranging from 1–100 GHz. An advantage of using a radar-based active sensor is that radar can travel through most materials found in a washroom or bathroom, and so the radar-based active sensor may be placed in an unobtrusive position, such as behind a wall, toilet or faceboard.

Figure 1B:
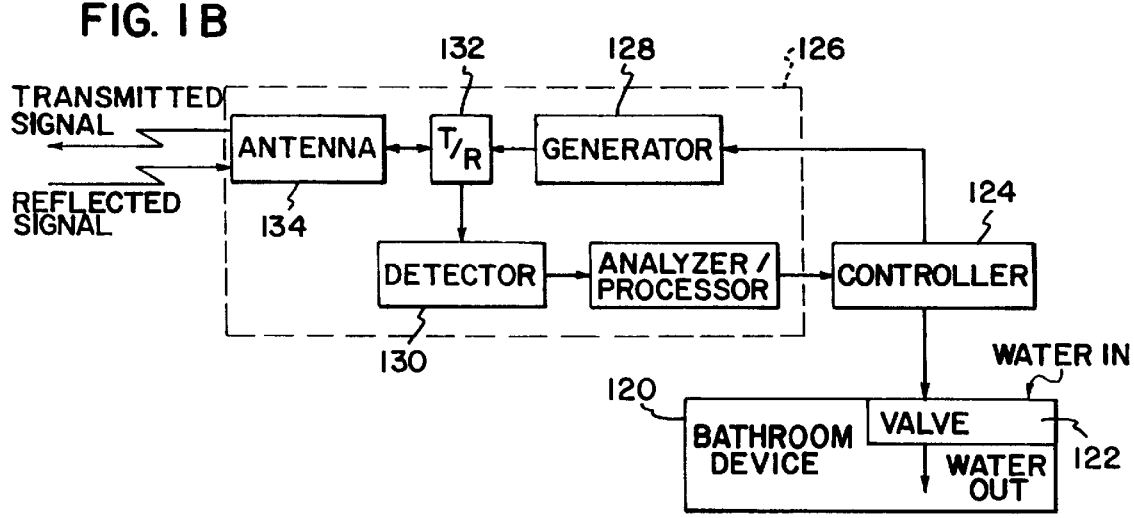
FIG. 1B is a schematic block diagram of elements of an exemplary active sensor controlling a washroom device.

A radar-controlled fluid flow control device 20 for use with a fixture is schematically illustrated in FIG. 1B. The device 120 includes an actuator 122 which is operated by a controller 124. The actuator 122 may be, for example, a valve to control the flow of water in a toilet or urinal, or a faucet in a wash basin, bathtub or whirlpool. The actuator 122 may also direct a shower head, or lift a toilet seat, or pump soap or lotion from a dispenser. Other examples of actuator 122 are provided hereinbelow. A radar unit 126 is used to send input data to controller 124. The radar unit 126 typically includes a generator 128 to generate the radar signal and a detector 130 to detect the reflected radar signal. A transmission/receive (T/R) switch 132 connects the antenna 134 to the generator 128 for transmission and to the detector 130 for reception. It will be appreciated that other radar configurations may be employed, for example where there is a separate antenna for transmission and reception.

As an example, the controller 124 may include a solenoid with an armature attached to the valve 122 to open or close the valve 122 in response to signals from the radar unit 126. The controller 124 may also include complex components such as a microprocessor to provide a programmed response based on the signals from the radar unit 126. Such a programmed response may depend on the type of signal received (i.e., presence of an individual or motion of an individual) or the sequence of the signals (i.e., two consecutive signals corresponding to entry and exit of an individual from a radar sensor field).

A variety of radar transmitters can be used. One type of radar transmitter continuously radiates an electromagnetic signal typically having a single frequency. One way for obtaining information from this signal is to measure the frequency of the reflected signal. If the object from which the signal is reflected is moving, then the frequency may be Doppler shifted, thus providing motion and direction information. This type of radar system is often referred to as "Doppler radar". It will be appreciated that other continuous-wave radar systems and methods may be used to obtain similar presence, motion, and direction information about a user in the radar sensing field. These radar systems and methods may also be used in the embodiments of the invention disclosed hereinbelow.

Figure 2A:
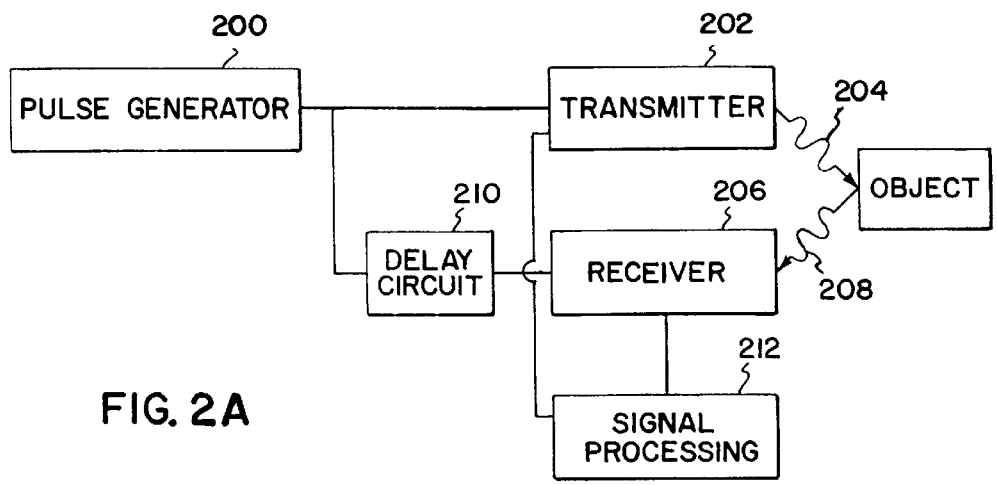
FIG. 2A is a schematic block diagram of a pulsed radar active sensor.

Other radar systems that may be used in practicing the invention include pulsed systems. One particular type of pulsed radar emits a burst of radar energy at a given frequency. Such a system is described in U.S. Pat. No. 5,361,070, incorporated herein by reference. This particular system, schematically diagrammed in FIG. 2, includes a pulse generator 200 which generates pulses at a selected pulse repetition frequency, a transmitter 202 to transmit the radar signal 204 in response to the pulses, a receiver 206 that receives the reflected radar signal 208, a delay circuit 210 for gating the receiver 206 after a known time delay, and signal processing circuitry 212 for obtaining the desired presence, motion, and/or direction information from the reflected radar signal 208. This is an example of a bistatic radar system, where the transmitter and receiver are separate.

Figure 2B:
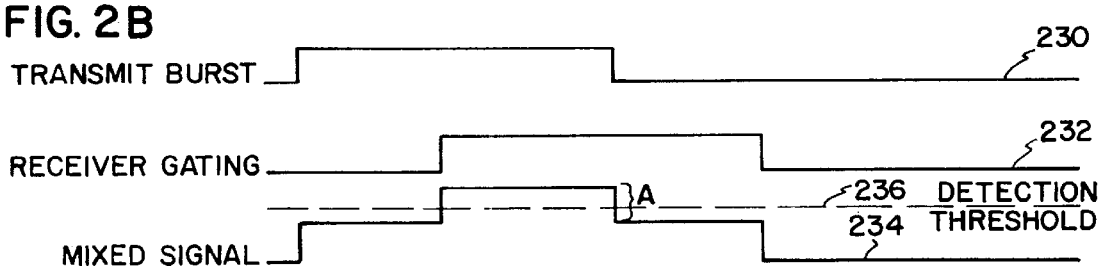
FIGS. 2B and 2C illustrate timing of signals for different embodiments of a pulsed radar active sensor.

A timing diagram for this radar system, illustrating the transmit burst 230, the receiver gating 232, and the mixed signal 234 is shown in FIG. 2B. The detection threshold 236 of the circuit may be set at a value sufficiently high that a mixed signal, formed only when both the transmit burst and the received signal are present, triggers detection. This configuration provides a maximum detection range. The only detectable signals arise from objects that are close enough to the transmitter 202 and receiver 206 that a transmitted burst travels to the object and is reflected back to the receiver within the duration of the burst. Only then is the mixed signal 234 larger than a predetermined detection threshold 236. A sensor field can then be defined as that volume of space within the maximum range of the radar system and where an object within that sensor field may be subject to detection.

Another type of pulsed radar system is ultra wideband (UWB) radar which is based on the transmission of pulses having nanosecond or subnanosecond pulse lengths. Examples of UWB radar systems can be found in U.S. Pat. Nos. 5,361,070 and 5,519,400, incorporated herein by reference. It will be appreciated that several other types of UWB radar system are also applicable. Schematically, an UWB radar system may be similar to that illustrated in FIG. 2A.

Figure 2C:
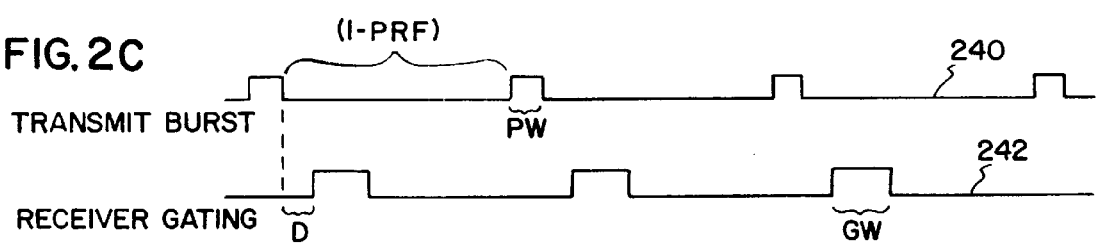

In UWB operation, transmit pulses 240 are emitted by the transmitter 202 at a pulse repetition frequency (PRF) determined typically by the pulse generator 200, as shown in FIG. 2C. The receiver 206 is gated open by a gating signal 242 after a delay period (D) provided by the delay circuit 210. The receiver 206 is typically gated open after the emission of the transmitted radar pulses 204. Thus, the UWB radar may be operated as a monostatic system, where the transmitted and received signals share the same antenna. Of course, an UWB radar may also be operated as a bistatic or multi-static system.

In the radar systems described above, the delay circuit 210 may provide a fixed or variable delay period. A variable delay may be varied by discrete time lengths, or may be continuously variable. It will be appreciated that the delay circuit 210 is indicative of a relative delay between the time of transmitting the radar pulse 204 and the time at which the receiver 206 is gated. Other triggering arrangements are possible, for example where the receiver 206 is triggered after a fixed delay, while a variable delay unit is used to trigger the transmitter 202.

The delay circuit may be of many applicable forms, including a simple cable, where the delay period corresponds to the length of time taken by a pulse to traverse cable, or a programmable delay line. In any case, the delay period, D, is the timing difference between the starting the transmitted radar pulse and starting the receiver gate pulse.

Figure 3:
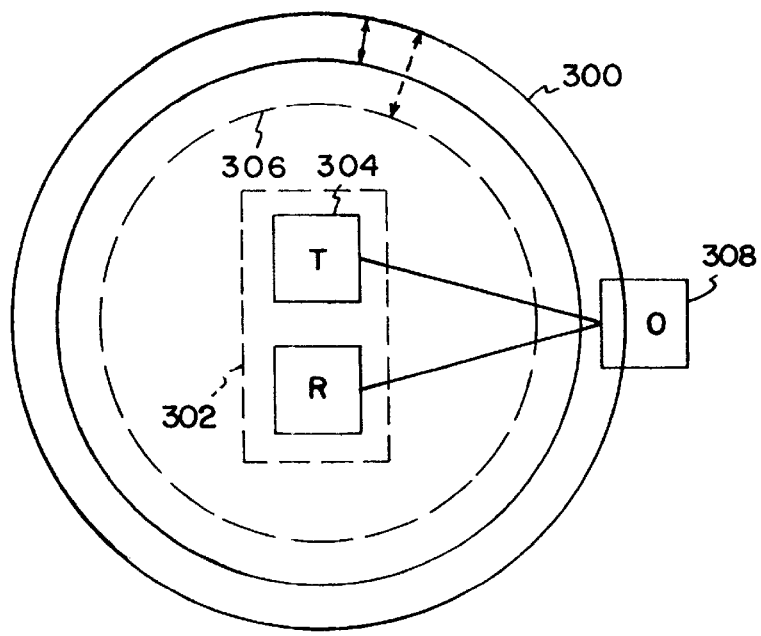
FIG. 3 illustrates a detection shell of an ultra-wideband radar system having the timing diagram of FIG. 2C.

In UWB systems, the delay period defines a detection range shell 300 for the radar, illustrated in FIG. 3. The distance of the detection range shell 300 from the radar 302 is determined by the delay period: a longer delay period leads to a shell 300 spaced further from the transmitter 304. The width of the shell depends on the transmit pulse width (PW) and the receiver gate width (GW). A longer pulse width or gate width produces a wider shell 306 (inner boundary in dashed line). Characteristics of an object 308 in the shell, such as the presence of the object 308, the motion of the object 308 and the direction of the object 308, can be determined using UWB radar systems. The detection range shell defines the sensor field of the UWB radar system.

The position of an individual in the sensor field may be determined by sweeping through a series of consecutively longer range gate values. i.e. moving the shell 300 increasingly further from the radar 302. The detection of a received signal indicates the distance of the individual away from the radar system.

The received signal may be processed by subtracting a background signal to remove static clutter and other background effects. The background signal may be updated periodically to account for environmental changes.

Motion of an individual can be determined by a variety methods including the previously described Doppler radar system. An alternative method of motion detection is described in U.S. Pat. Nos. 5,361,070 and 5,519,400 in which the received signal is bandpass filtered to leave only those signals that can be ascribed to human movement through the range detection shell. Typically, the bandpass filter is centered in the range 0.1–100 Hz.

U.S. Pat. No. 5,519,400 also describes a method for the determination of the direction of motion of an individual. This method includes the modulation of the delay period by ¼ of the cycle of the center frequency of the transmission pulse. By doing this, quadrature information can be obtained which can then be used to determine the direction of motion.

Figure 26:
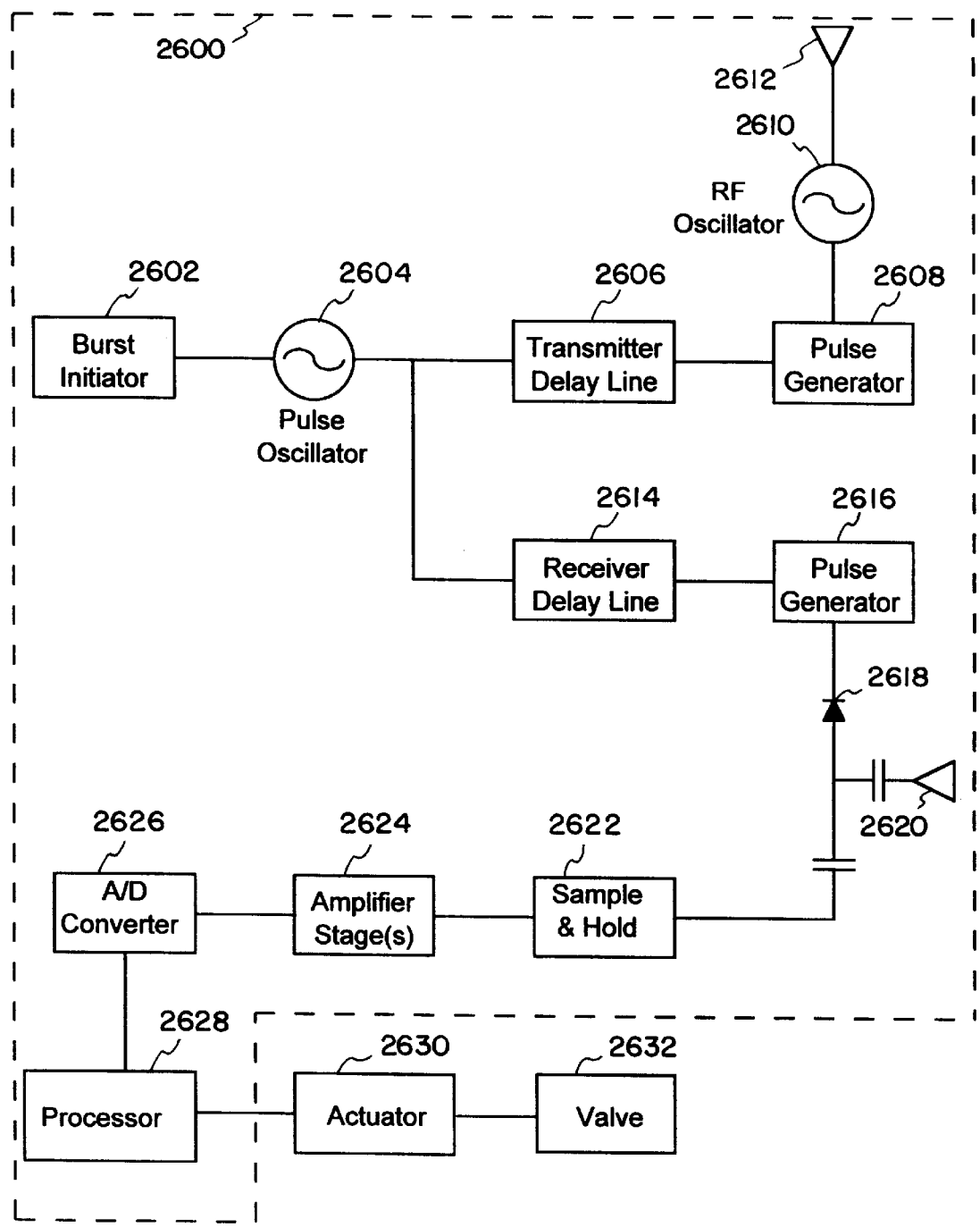
FIG. 26 illustrates another embodiment of a radar-based sensor.

One exemplary low power radar sensor 2600 is illustrated in FIG. 26. The radar sensor 2600 includes a burst initiator 2602 that triggers the beginning of the burst and may, optionally, trigger the end of the burst. A burst rate is defined as the rate at which bursts are provided. The burst width is the length of time of the burst. The time between bursts is the rest period. For many applications, the burst rate can range from, for example, 200 Hz to 10 kHz and often from, for example, 500 Hz to 2 kHz. The burst width can range from, for example, 1 to 200 microseconds and often from, for example, 5 to 100 microseconds. However, higher or lower burst rates and longer or shorter burst widths may be used. The particular burst rate and burst width may depend on factors, such as the application and the desired power usage.

The burst starts a pulse oscillator 2604 that provides the triggering signals for each pulse. The pulse oscillator may operate at, for example, 0.5 to 20 MHz, and often from, for example, 2 to 10 MHz to provide, for example, 5 to 2000 pulses per burst. Higher or lower oscillator rates and larger or smaller numbers of pulses per burst may be used, depending on factors, such as, for example, the application and the desired power usage.

These triggering signals are provided along an optional transmitter delay line 2606 to a pulse generator 2608 that produces a pulse with a desired pulse length. The optional transmitter delay line 2606 may provide a desired delay to the transmission pulses to produce a desired difference in delays between the transmitter and receiver pulses. In some embodiments, the transmitter delay line 2606 is used to provide a delay of, for example, one quarter cycle of an RF oscillator frequency to allow for quadrature detection, as described below.

The pulse generator provides a pulse with a desired pulse length at each pulse from the pulse oscillator. The width of the pulse determines, at least in part, the width of the detection shell, as described above. The pulse width may range, for example, from 1 to 20 nanoseconds, but longer or shorter pulse widths may be used.

The pulse is then provided to an RF oscillator 2610 that operates at a particular RF frequency to generate a pulse of RF energy at the RF frequency and having a pulsewidth as provided by the pulse generator 2608 at a pulse rate determined by the pulse oscillator 204 during a burst period as initiated by the burst initiator 2602. The RF frequency may range from, for example, 1 to 100 GHz, and often from, for example, 2 to 25 GHz, however, higher or lower RF frequencies may also be used.

The pulses of RF energy are provided to an RF antenna 2612 for radiating into space, as described above. The short duration of the pulses typically results in the irradiation of an ultra-wideband (UWB) signal. In addition, the RF antenna 2612 may ring, thereby providing multiple detection shells for each pulse.

In addition to producing pulses for the transmitter, the pulse oscillator 2604 also provides pulses to gate the receiver. The use of the same pulse oscillator 2604 for the transmitter and receiver portions of the radar sensor 2600 facilitates timing between the portions. Pulses from the pulse oscillator 2604 are sent to the receiver delay line 2614 that delays the pulses by a desired time period to determine, at least in part, the distance of the detection shell from the radar sensor, as described above. The receiver delay line 2614 may be capable of providing only one delay or a plurality of delays that can be chosen, as appropriate, to provide different radar ranges.

After being delayed, the pulses are provided to a receiver pulse generator 2616 that generates a receiver pulse with a desired pulse width. The width of this pulse, as well as the width of the transmitter pulse, determine, at least in part, a width of the detection shell, as described above. Only during the receiver pulse is the receiver gated open, via, for example, a diode 2618, to receive radar signals. The pulse width of the receiver pulse typically ranges from zero to one-half of the RF cycle time (e.g., zero to 86 picoseconds at a 5.8 GHz transmit frequency), and often, from one-quarter to one-half of the RF cycle time (e.g., 43 to 86 picoseconds at a 5.8 GHz transmit frequency). However, longer pulse widths may also be used. Receiver pulses are only produced during the burst. The receiver pulses may or may not overlap with the transmitter pulses.

Receiver signals are received via the receiver antenna 2620, but these signals are only sampled during the receiver pulses. The sampling occurs at, for example, a sample and hold component 2622. Typically, the sample and hold component 2622 includes a gate that can be opened between bursts to isolate the remainder of the circuit.

The receiver signal is then provided to one or more amplifier stages 2624. Multiple amplifier stages may be used to provide simultaneous outputs from multiple transmitter and receiver delay line settings.

The signal is then provided to an optional A/D converter 2626 which then sends a corresponding digital signal to a processor 2628, for example, a microprocessor that evaluates the signal and provides a response. The processor 2628 may operate an actuator 2630 according to the converted receiver signal. For example, the processor may direct the actuator 2630 to open or close a valve 2632. Alternatively, the receiver signal may be analyzed using an analog processor (not shown) that may then operate the actuator.

It will be understood that this low power radar sensor may be used to operate devices other than an actuator or a valve. In addition, components such as one or more of the amplifier stages, the A/D converter, and the processor may be included with the radar sensor or they may be external to the sensor.

Figure 14:
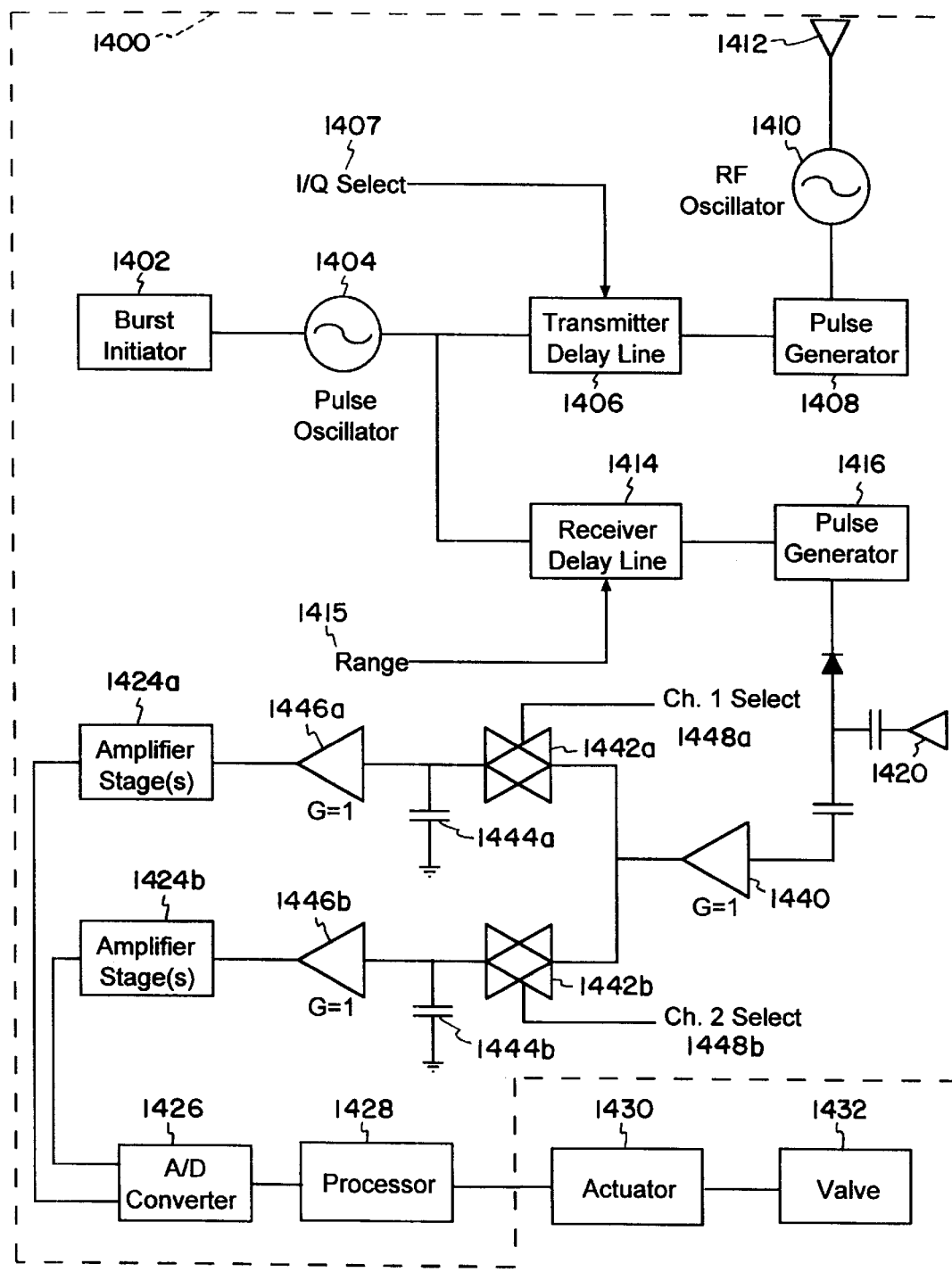
FIG. 14 illustrates an embodiment of a radar-based sensor.

Another embodiment of a radar-based sensor 1400 is illustrated in FIG. 14. The radar sensor 1400 includes a burst initiator 1402, a pulse oscillator 1404, a transmitter delay line 1406, a pulse generator 1408, an RF oscillator 1410, and a transmitter antenna 1412, similar to those described above with reference to FIG. 26.

An I/Q select 1407 may be provided on the transmitter delay line 1406. The I/Q select 1407 can change the transmission pulse delay by, for example, one quarter of a cycle of the RF frequency of the RF oscillator 1410. This can be used for quadrature detection to enable determination of the direction of movement of an object within the sensor field. For example, during a first burst, the transmission pulse delay may be a first time and during a second burst the transmission delay may be a second time that is a combination of the first time plus one quarter of the cycle time at the RF frequency. The radar sensor may continue to alternate phases and use the corresponding signals for quadrature detection to determine direction of movement. In some embodiments, more than one burst may be provided before alternating or the alternation may occur during a burst.

The receiver portion of the radar sensor 1400 includes a receiver delay line 1414 coupled to the pulse oscillator 1404, a pulse generator 1416, and a receiver antenna 1420, similar to those described above with reference to FIG. 26. An optional range select 1415 is provided with the receiver delay line 1414 to selectively alter the delay provided by the receiver delay line 1414.

An exemplary sample and hold component coupled to the receiver antenna 1420 and pulse generator 1416 is illustrated in this embodiment, however, other sample and hold components can be used. The sample and hold component includes a first buffer 1440 (e.g., an operation amplifier with gain of about one), a gate 1442a (e.g., a transmission gate), a hold capacitor 1444a connected to ground, and a second buffer 1446a.

This embodiment also illustrates the use of a two channel device with the second channel having a gate 1442b, a hold capacitor 1444b connected to ground, and a second buffer 1446b. In this embodiment, both channels use the same first buffer, although individual first buffers may also be used. It will be understood that other embodiments may have only one or three or more channels. Each channel has a channel select 1448a, 1448b coupled to the gate 1442a, 1442b to open and close the channel. All of the channels are typically closed between bursts and typically only one channel is open during each burst. This isolates the subsequent amplifiers except when a signal for a particular channel is received.

The signal from each channel is then passed through one or more amplifier stages 1424a, 1424b. The amplified signal can then be processed by, for example, analog circuitry (not shown) or by an A/D converter 1426 and a processor 1428. The processed signal can then be used to operate, for example, an actuator 1430 to open or close a valve 1432. It will be understood that the radar sensor can also be used for other purposes than operating an actuator and a valve.

In this radar sensor 1400, the processor 1428 may be a microprocessor that also operates as the burst initiator 1402, I/Q select 1407, range select 1415, channel 1 select 1448a, and/or channel 2 select 1448b. Alternatively, one or more other microprocessors or other components provide one or more of these functions.

Figure 15:
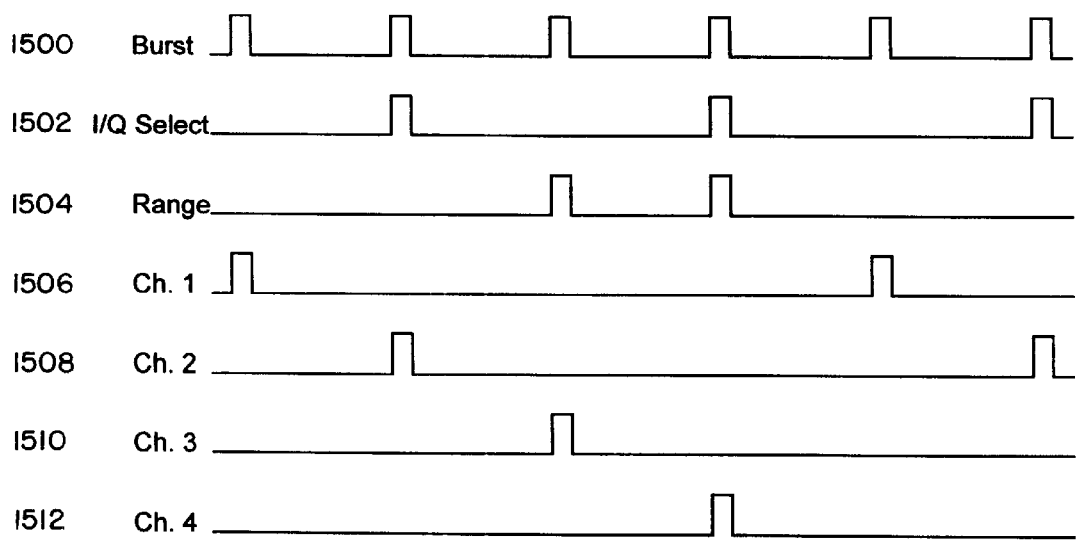
FIG. 15 illustrates an exemplary timing diagram for a four channel radar detector with in-phase and quadrature detection at a near and a far range.

An exemplary timing diagram for a four channel radar detector with in-phase and quadrature detection at a near and a far range is illustrated in FIG. 15. The burst channel 1500 produces bursts at regular intervals according the burst rate. The I/Q select channel 1502 alternates between in-phase (no signal in I/Q select channel) and quadrature detection (signal in I/Q select channel). The presence of a signal in the I/Q select channel causes the transmission delay line to increase the delay of the transmission pulses by, for example, one-quarter of a wavelength of the RF frequency.

The range channel 1504 allows for in-phase and quadrature detection at a near range (no signal in range channel) followed by in-phase and quadrature detection at a far range (signal in range channel). The presence of a signal in the I/Q select channel causes the receiver delay line to provide a longer delay.

Each of the channel selects are operated one at a time to provide an appropriate signal through the appropriate channel. For example, as illustrated in FIG. 15, channel one 1506 corresponds to in-phase detection at a near range, channel two 1508 corresponds to quadrature detection (when combined with the signal from channel one) at a near range, channel three 1510 corresponds to in-phase detection at a far range, and channel four 1512 corresponds to quadrature detection (when combined with the signal from channel three) at a far range. In this particular embodiment, channel information is obtained at one quarter the burst rate.

The number of channels, their assignment to particular signals, the order of detection, the number of bursts before changing channels, and other similar aspects of the timing diagram can be altered. By using such timing mechanisms, a variety of different signals can be obtained and used to determine characteristics of an object, such as presence, motion, and/or direction of motion, in the sensor field.

One configuration of a transmitter 700 and receiver 702, connected by a leaky transmission line 704 is shown in FIG. 7. The leaky transmission line 704 acts as an antenna for both the transmitter 700 and receiver 702, emitting and receiving electromagnetic signals. In one particular embodiment, the transmitter 700 and receiver 702 are spatially separated with the leaky transmission line 704 forming a curved path therebetween. This embodiment may be advantageous for use with a wash basin 706 for controlling the flow of water through the faucet 708. In another embodiment (not shown), transmitter 700 and receiver 702 are disposed close to each other and the transmission line 704 forms a curved or irregular path between the transmitter and receiver. In some cases, the curved path may form an approximately circular or ovoid shape.

Examples of suitable leaky transmission lines include a twisted pair twin lead transmission line, a co-axial cable, a micro-strip transmission line, a coplanar strip or wave guide transmission line, or a single wire Gaobau line. The leaky transmission line 704 is arranged and configured to emit and receive sufficient radiation to generate a detectable signal at the receiver.

Typically, the leaky transmission line 704 generates a sensor field 710 around the transmission line 704 for detection of objects in proximity to the transmission line 704. Typically the sensor field 710 has a roughly tubular shape, centered along the leaky transmission line 704.

The system may also use optically based sensors. Optically-based sensors generally come in two types, namely active and passive. The active types may be incoherent or coherent sensors. Incoherent sensors use an incoherent light source, such as a light emitting diode or an incandescent lamp. They are often used in a "trip wire" system, where the light source continuously illuminates a detector. Movement of an object into the line of sight between the light source and detector blocks the light beam and the detector records a reduction in the intensity of light, thus indicating the presence of an object, such as a user, in the beam. Incoherent detectors may also be used in a "radar" type situation where the detected signal is reflected by the target.

To increase the signal to noise ratio of the active sensor, the light source may be operated in a pulsed mode at high repetition rates, which is advantageously performed using a coherent light source such as a laser. Lasers are both easier to operate at high repetition frequency and to operate in a pulsed mode with a short optical pulse than other light sources.

An advantage of using laser radar is that the divergence of the laser beam is typically low, with the result that the clutter problem in the laser-based active sensor is reduced.

Figure 4:
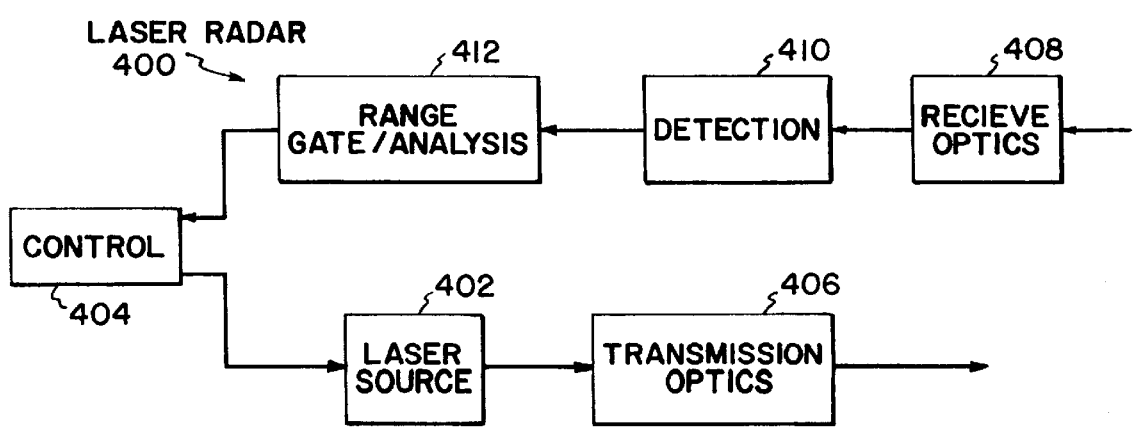
FIG. 4 illustrates a schematic block diagram of a laser radar active sensor.

A block diagram schematic of a typical laser radar active sensor 400 is provided in FIG. 4. A laser 402, typically a semiconductor diode laser operating in the infra-red portion of the electromagnetic spectrum, is controlled by a controller 404 to generate a sequence of pulses at a selected pulse repetition frequency. The light pulses are transmitted by the transmission optics 406 in the desired direction.

Some of the light reflected by the target is captured by the receiving optics 408. One or more optical filters may be used in the receiving optics to provide enhanced discrimination over ambient light. The optical signal is then detected by a detector 410 and analyzed in an analyzer 412 before being transmitted to the controller 404.

The detector may also be range-gated by the analyzer 412 in order to select the detection of signals from a particular "shell" at a given separation from the transmitting optics, in a manner similar to that described above for the UWB radar. If the detector 410 and analyzer 412 are sufficiently fast, then range-gating may not be necessary. It may also be advantageous to have a background signal that can be subtracted from the return signal, so as to remove information on stationary objects, such as walls, doors and the like.

Several types of active sensors use the transmit and receive type of geometry described hereinabove. However, as described above, another active sensor geometry includes a transmitter and a receiver pointing at each other and separated by a region of space into which the user is expected to ingress. This is often referred to as a "trip wire" sensor. A detection signal is generated if the beam between the transmitter and the receiver is blocked. If operated in a pulsed mode, the receiver is gated open so that it only receives the signal directly transmitted from the transmitter. If the signal is reflected, it either fails to reach the receiver or it is reflected towards the receiver after the receiver is gated closed. The use of a gated, pulsed system provides an advantage where several "trip wire" sensors are used, in that a gated receiver is likely only to detect a signal from its associated transmitter, and is prevented from detecting a signal generated by another sensor nearby. "Trip wire" sensors may operate at RF/microwave frequencies, or at visible/IR frequencies.

Most of the following applications of active sensors to washroom devices and facilities are discussed in the context of using a radar as the active sensor. This is not a limitation of the invention, and it will be appreciated that other active sensors may be employed instead of radar.

The fluid flow control devices of the invention can be used in a wide variety of applications, of particular interest is the use of such devices in washroom and bathroom fixtures, such as urinals, toilets, bidets, and faucets. Active sensors in such devices can facilitate the operation of these fixtures without active control being exerted by the user. Importantly, the user can operate such devices in a touchless manner: the fixture operates in response to actions of the user, for example including approaching the fixture, leaving the fixture, or placing a body part in proximity to the fixture.

Figure 5:
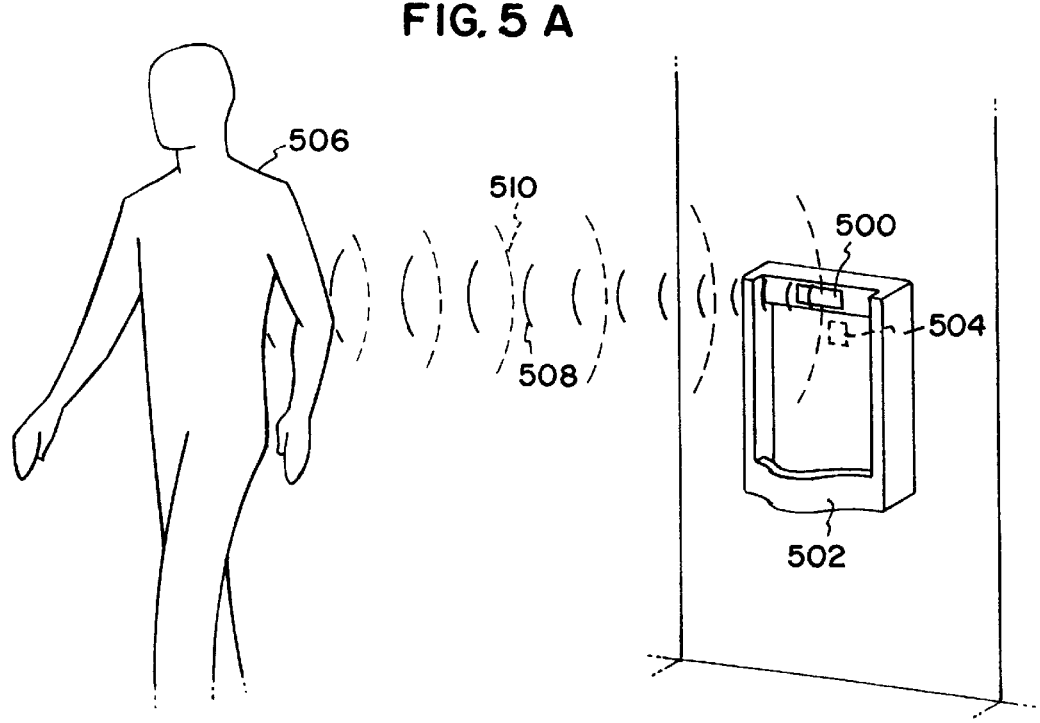
FIGS. 5A–5E illustrate the application of active sensors to controlling washroom and bathroom devices.
Figure 5:
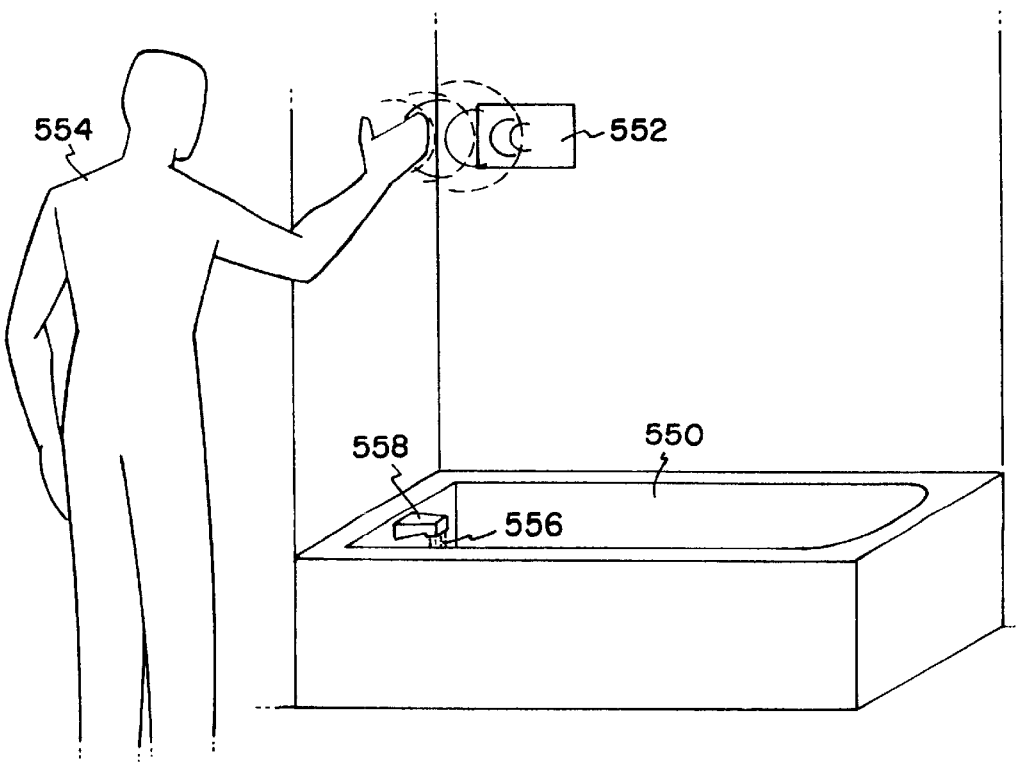

Several actions are illustrated in FIGS. 5A–5E. In FIG. 5A, the active sensor 500 is used in the control of a urinal 502. The active sensor 500 transmits a signal 508 (solid lines), a portion of which is reflected back to the sensor 500 as a return signal 510 (dashed lines). The active sensor 500 is coupled to the flushing valve 504 so as to control the flushing mechanism of the urinal 502. In one of its most straightforward forms, the urinal 502 is flushed when the user is detected to move away from the urinal 502, presumably after he has finished using the urinal 502.

FIGS. 6A–6D illustrate the implementation of a radar 600 in a urinal 602 in greater detail. The valve 604, under control of signals generated by the radar 600, is coupled to the water inlet 606 of the urinal so as to control the flushing mechanism of the urinal 602. The radar 600 detects, for example, the presence of a user at the urinal 602 or, alternatively, the motion of the user towards and then away from the urinal 602. In one particular embodiment, the radar 600 may detect the presence of the user by comparing a current radar signal with a previously recorded background signal. If the current radar signal differs from the background signal by an amount greater than a threshold difference, then the presence of a user is indicated.

In another approach to detecting a user, it may be required that the signal indicating the presence of a user remain above a threshold level for a predetermined amount of time, for example 5 seconds, to ensure that an actual user is present. An advantage of this approach is that it distinguishes the signal generated by a user from nonuser signals, such as may be generated by a passerby or an insect near the radar 600.

After a user is detected, the radar 600 continues to interrogate the sensor field 610 until the user leaves. The departure of the user is indicated by the reduction of the received radar signal to less than the threshold difference above the background signal. At this time the valve 604 is opened to flush the urinal 602 to remove waste deposited in the urinal 602 by the user.

In another approach to determining when the user leaves the sensor field 610 after detecting his presence, the radar 600 may require that the absence of the user be indicated for a predetermined amount of time, for example 3 seconds.

The radar 600 may record a background signal at regular intervals, when a user is not present, to record any possible environmental changes.

In another embodiment, the radar 600 detects movement in the sensor field 610, indicating that a user is approaching the urinal. The radar 600 continues to monitor the sensor field 610 until there is motion indicating that the user has departed from the sensor field 610. After the user's departure, the valve 604 is opened to flush the urinal 602 with water.

Another embodiment combines motion detection with direction detection, to determine the correct operation of the urinal 602. After the user enters the sensor field 610, the sensor looks for a pattern of motion toward and away from the urinal 602. After the user exits the sensor field 610, the valve 604 is opened to flush the waste through the urinal 602.

Although the valve of the fluid flow control device is typically located proximately to the water inlet conduit of the fixture, other portions of the radar-based control device may be placed in other positions relative to the fixture. FIGS. 6A–6D illustrate the placement of a radar 600 behind the urinal 602 (FIGS. 6B and 6D) or within the urinal 602 (FIGS. 6A and 6C), for example placed within cavities in the porcelain urinal fixture. Microwave-based active sensors such as the radar 600 have a wide range of possible locations, since microwaves can penetrate most construction materials, and so the control system including the radar 600 may be placed behind a wall or within the vitreous china or porcelain of the urinal 602 or other washroom fixture.

Figure 6A:
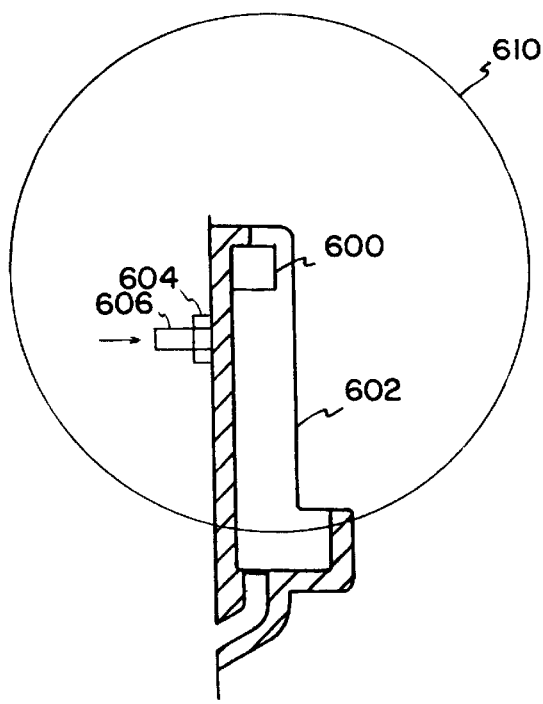
FIGS. 6A–6D illustrate side elevational views of various embodiments of a urinal incorporating an active sensor for control.
Figure 6B:
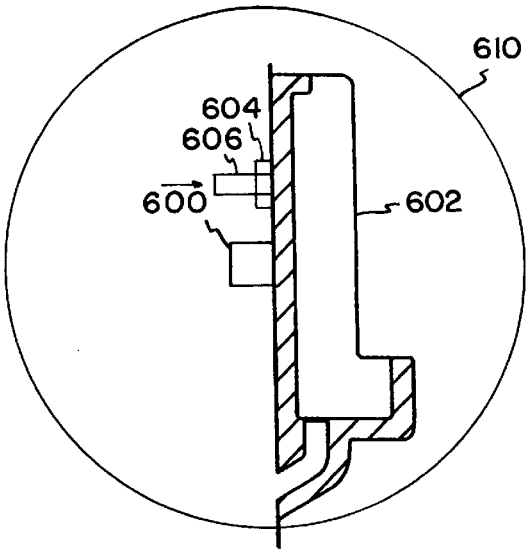

An advantageous placement of the radar 600 is within the fixture itself, with the detector bidden from the user. FIG. 6A shows the placement of radar 600 within the urinal 602. This configuration has advantages over the configuration illustrated in FIG. 6B, in which the radar 600 is placed behind the urinal 602, because a greater portion of the sensor field 610 is presented toward the region that a user is expected to occupy.

Furthermore, the radar 600 of FIG. 6A has less sensing area in unneeded directions. This may be important where, for example, there may be other triggering activities occurring on the other side of a wall on which the urinal 602 is placed. Often restrooms are positioned so that toilet/urinal facilities of men's and women's restrooms are attached on opposite sides of the same wall for ease of plumbing. If the radar sensor field 610 extends through the rear wall, then activities on the other side of the wall may cause incorrect signals to be detected by the radar 600.

Figure 6C:
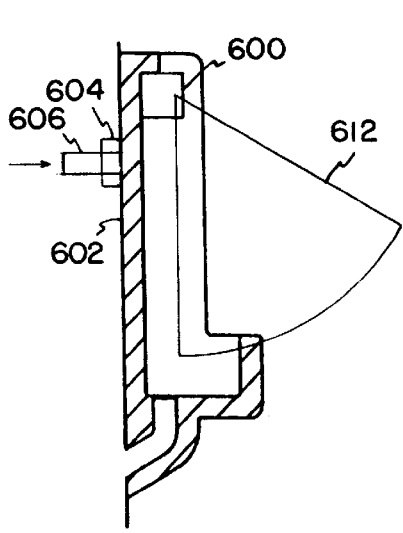
Figure 6D:
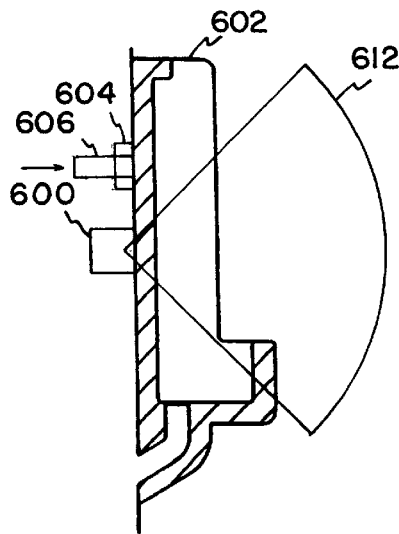

In another embodiment, the direction of transmission from the radar 600 is restricted so that the sensor field 612 is conically shaped, as illustrated in FIGS. 6C and 6D. It will be appreciated that the generation of directional sensing fields 612 is dependent on the frequencies transmitted and the antenna used for transmitting the radar signal. Directional sensor fields 612 are especially useful in restrooms where a number of urinals 602 or other radar operated fixtures are in close proximity to each other. Such conditions are common in public restrooms, but may also occur in household bathrooms where the toilet, sink, and/or shower or bathtub are touchlessly controlled.

Another advantage of using directed radar signals is avoiding the detection of water. The water released by the valve during flushing may be detectable by the radar 600. Spurious signals arising due to water flow may be avoided by directing the radar transmission away from the fluid stream. Additionally, signals from the radar 600 may be ignored, or the radar 600 turned off altogether for a period of time after flushing of urinal 602. Typically, this period of time is approximately equal to the length of time that the valve 604 is open to minimize the chance that a new user arrives before the radar 600 is reset to detect another user.

It is desirable that the radar 600 be small and that it have an antenna with a size of only a few inches, in order to easily fit into existing fittings and to reduce intrusiveness. This typically requires operating the sensor with a central frequency ranging from approximately 1 GHz to 100 GHz.

It will be appreciated that considerations similar to those described above with regard to controlling a urinal 602, such as the detection of water, or other, interfering activities, may be necessary in controlling other washroom devices, including wash basins and toilets. Of particular interest is the control of a wash basin, as illustrated in FIG. 1, where the valve, or valves, controlling water flow typically remain open until either the presence or motion of the user within the sensor field is no longer detected. Alternatively, a timing mechanism may be used so that the radar detector senses for motion or presence in the field after a given time (e.g., 15–45 seconds) to determine if a user is still using the fixture. The problem of detecting the continued presence of a user, with a nearby stream of water acting as a source of spurious signals, is addressed in the provisional patent application entitled "Devices Utilizing Radar Detection of a User for Initiating Fluid Flow", filed on Jul. 18th, 1997, by C. B. C. Bachmann, S. M. Tervo, W. Burnett and D. C. Shafer, Ser. No. 60/052,960, and incorporated herein by reference. Different approaches to controlling a faucet are discussed in that patent application, including a "trip-wire" type of bistatic sensor, and a combination of two or more sensors.

Figure 5B:
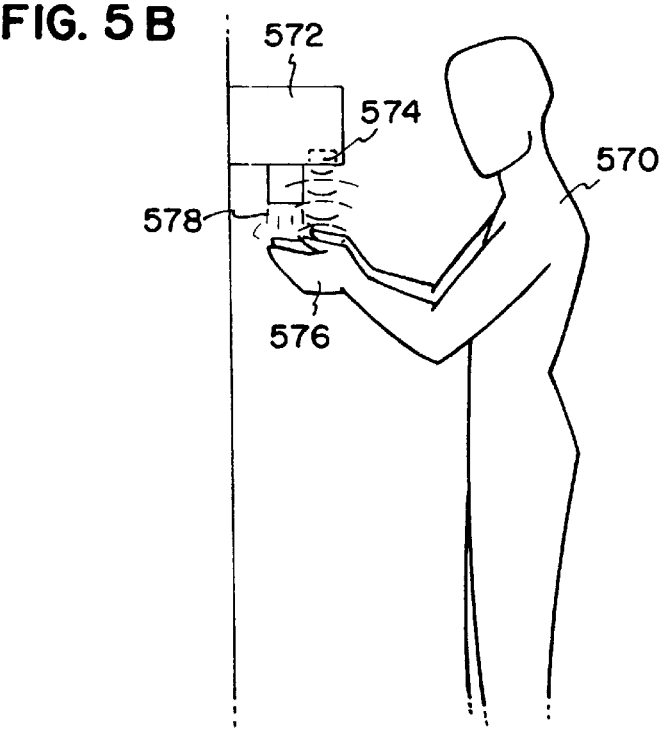
Figure 5D:
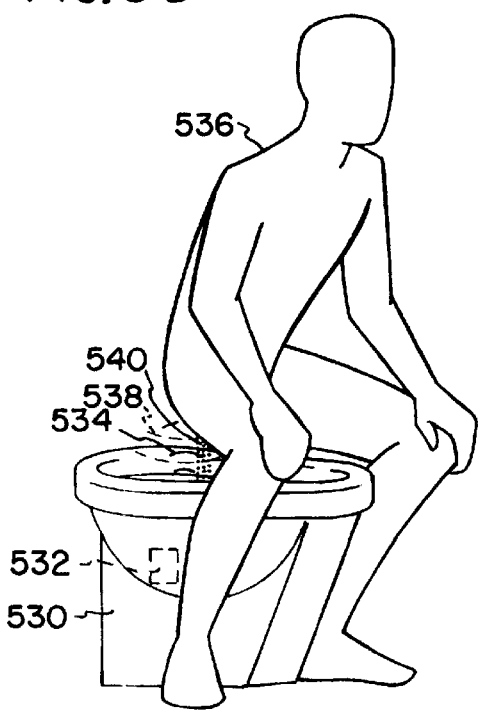
Figure 5C:
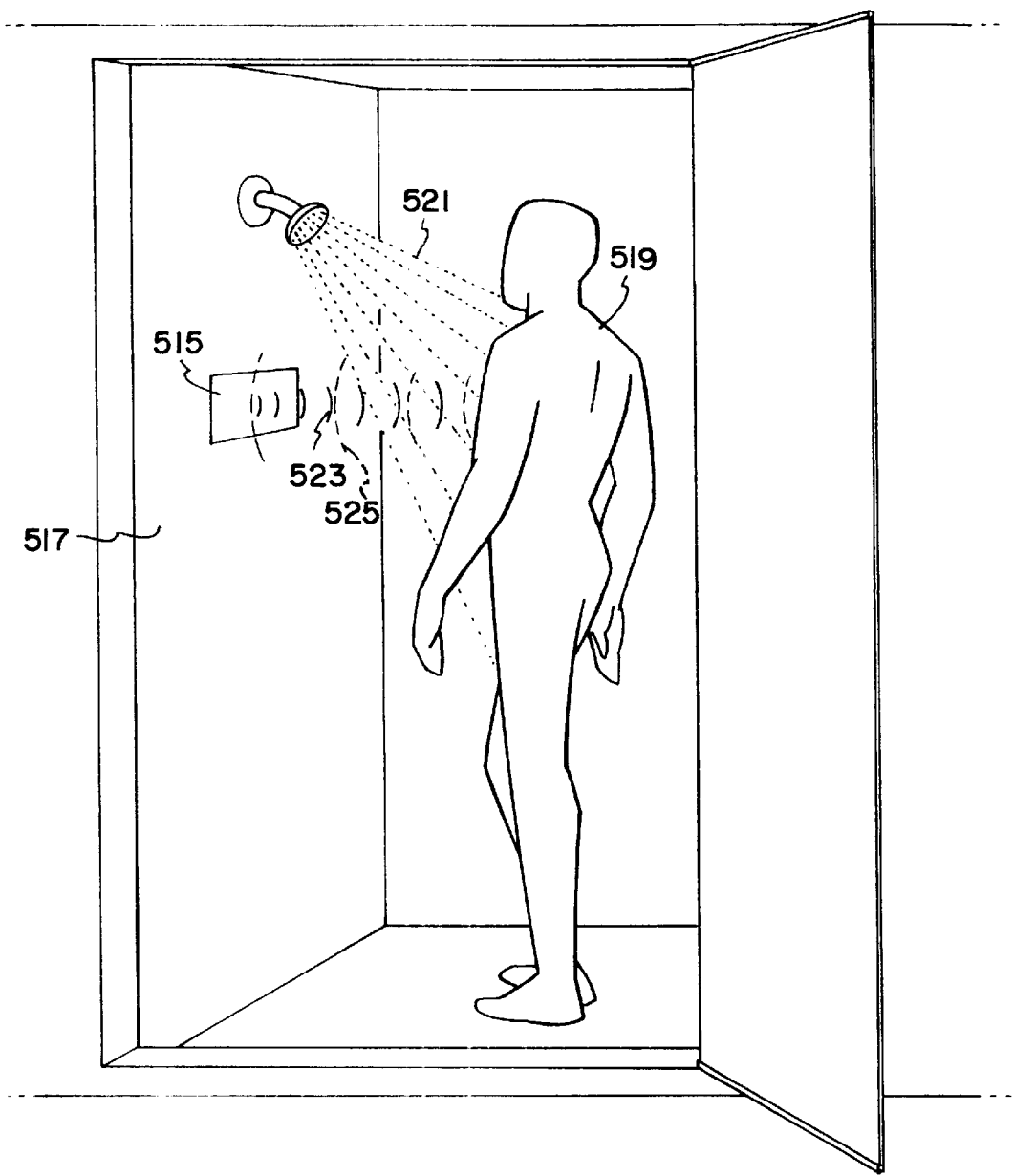

FIGS. 5B–5E illustrate control of other washroom devices by an active sensor. FIG. 5C illustrates a shower stall 517 using an active sensor 515. The active sensor 515 transmits a probing radar signal 523, a portion of which is reflected by the user 519 as a return signal 525 (dashed lines). Accordingly, the active sensor 515 detects the entry of the user 519 into the shower stall 517, and commences the flow of water 521.

FIG. 5D illustrates a bidet 530 using an active sensor 532. The active sensor 530 transmits a probing signal 534, a portion of which is reflected by the user 536 as a return signal 538 (dashed lines). Accordingly, the active sensor 532 detects a user 536 moving into position to use the bidet 530, at which time the flow of water 540 to the bidet 532 is turned on.

FIG. 5E illustrates a bathtub 550 using an active sensor 552. In this case, it is possible to make the water flow into the bathtub 550 only while the user 554 is within the active sensor's range. However, it may also be desirable to allow the user 554 to start the flow of water 556 into the bathtub 550 and then leave to do other tasks, such as prepare for the bath. Therefore, in this latter case, the bathtub 550 may include an active sensor 552 which detects the user 554 making an initiation signal, such as waving or the like. The faucet 558 for the bathtub is then switched open to allow the bathtub 550 to fill. The faucet 558 may be switched off by a number of mechanisms. For example, the faucet 558 may be switched off by the user 554 repeating the signal used for initiation, or the faucet may be turned off after determining that the water in the bathtub has reached a pre-selected depth. Another approach is to meter the amount of water delivered by the faucet 558 and to close the faucet valve after a preselected amount of water has been delivered into the bathtub 550. A similar device may be used for filling a whirlpool.

FIG. 5B illustrates a user 570 activating a radar-controlled air-blower 572 for drying hands after washing. The radar 574 inside the air-blower 572 detects the approach of the user's hands 576 to the air blower 572, and activates the air blower 572 when the hands 576 are determined to be within a range predetermined to be useful for drying. The radar 574 de-activates the air blower 572 when the hands 576 are detected to be retracted from the flow of air 578.

One particular embodiment of antenna useful for transmitting and detecting a radar signal in the presence of water is the so-called "leaky transmission line" antenna, described in "Radar Detector Using Leaky Transmission Line", filed on Jul. 18th, 1997, by C. B. C. Bachmann, S. M. Tervo, W. Burnett and D. C. Shafer, Ser. No. 60/053,168, and incorporated herein by reference.

Figure 8A:
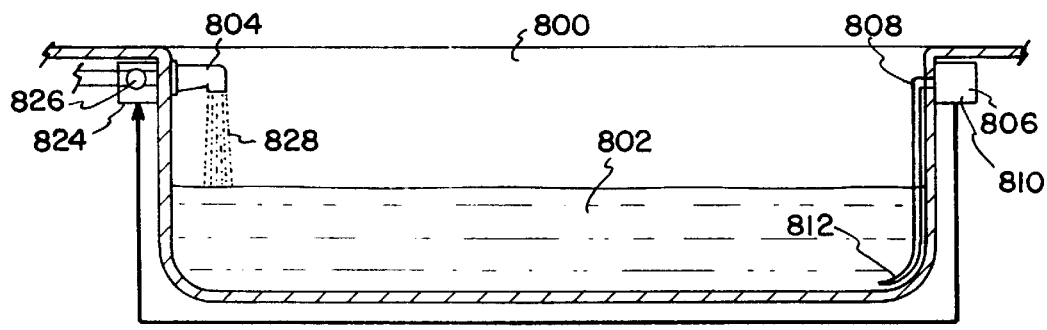
FIG. 8A illustrates the control of a bathtub using an active fluid level sensor.
Figure 8B:
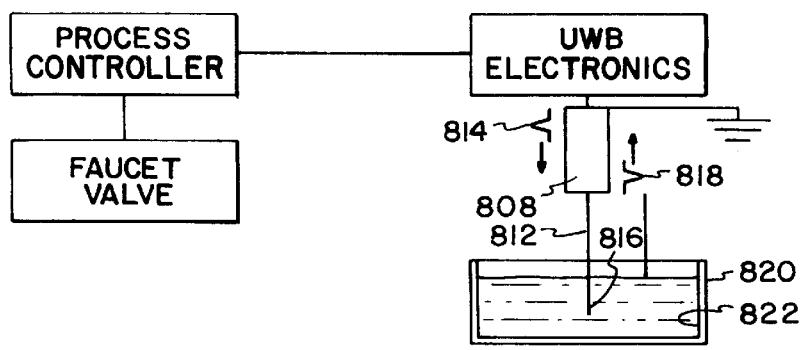
FIG. 8B illustrates an active fluid level sensor in detail.

In addition to detecting the presence or motion of a user, active sensors may also be used in determining other variables of interest in the restroom or bathroom setting. One particular such variable is the level of fluid in a container, such as a bathtub, wash basin or urinal. Fluid level sensing is also applicable to whirlpools. This application is described with reference to FIGS. 8A and 8B. In this example, illustrated in FIG. 8A, a bathtub 800 is filled by water 802 from a faucet 804 positioned at one end of the bathtub 800. An active fluid level sensor 806 is positioned at the other end of the bathtub 800 to sense the level of water 802 in the bathtub 800. The active fluid level sensor 806 may be placed at any position along the bathtub 800, but the illustrated position has the advantage that the water 802 may be smoother at the end opposite the faucet 804 while the bathtub 800 is being filled, and so a more precise reading of the water level may be possible.

In one particular embodiment, the active fluid level sensor 806 for sensing the water level is an UWB radar 810. However, instead of allowing the radar signal to propagate through free space, here the radar signal travels along a transmission line 808 from the UWB radar 810. The transmission line 808 has an unshielded portion 812 at the end opposite the UWB radar 810. Thus, an UWB signal 814 propagating along the unshielded portion 812 is affected by the dielectric environment surrounding the unshielded portion 812. For the frequencies present in the UWB signal, air has a low dielectric constant while water has a high dielectric constant. Thus, the UWB signal 814 sees a significant change in transmission line impedance upon entering that part of the unshielded portion that is under water 816. A time of flight measurement for the UWB pulse 818 reflected at this impedance change at the water surface permits determination of the position of the water surface. This technique is described further in U.S. Pat. No. 5,609,059 which is incorporated herein by reference.

The transmission line 808 may be small, having a diameter as small as 1 mm or less. The transmission line 808 may be installed within the container 820, so that part of the unshielded portion of the transmission line is physically within the fluid whose level is being measured. The transmission line 808 may also be buried within the wall of the container 820, for example in a cavity in the sidewall close to the inner surface 822 of the container 820. This second location has an advantage in that the inner surface of the container 822, for example the bathtub, may remain smoothly contoured. Also, the transmission line 808 may be replaced without disturbing the inner surface of the container.

The active fluid level sensor 806 may be combined with another active sensor to provide intelligent performance of the bathroom fixture. For example, the fluid level sensor 806 may be included in a bathtub 800, where the bathtub faucet 804 is switched on by the user waving his or her hand in front of a detection "window", as discussed earlier with respect to FIG. 5E. In such a case, the fluid level sensor 806 may be connected to the controller 824 for the faucet valve 826, to provide water height data to the controller 824 as the bathtub 800 is filled up. The faucet valve controller 824 may be programmed to shut the water off automatically when the bathtub water reaches a certain height. Thus, such a control system would allow a user to turn on the flow of water 828 to the bathtub 800 by a wave of a hand, and to come back some minutes later to a bathtub 800 automatically filled to the desired level.

The faucet controller 824 may also incorporate user height detection, as discussed hereinbelow, or the detection of some other measurable characteristic of the user. Such user characteristic detection may permit the faucet controller 824 to determine which user of a number of users, whose preference had been preprogrammed in the controller 824, activated the flow of water. Such preferences as depth and temperature of water could be associated with each preprogrammed user, so that the bathtub would fill to the desired depth, with water of the correct temperature for that user who initiated the bathtub filling sequence.

In an application where a whirlpool is controlled, the fluid level sensor may be connected to a valve to keep the level of water in the whirlpool "topped up" to a constant level, to compensate for water lost from the whirlpool through use.

In another embodiment of a combination of fluid level sensing and water valve control, the control system is used to detect nonstandard operation, and to provide a warning to the user or attendant. An example of such a system is illustrated in FIG. 9, in which a urinal 900 includes a user sensor 902 for detecting a user, and a fluid level sensor 904 for sensing the level of the water 906 in the urinal 900. The sensors 902 and 904 are connected to a common controller 912 that analyzes data received from each sensor 902 and 904.

Figure 16:
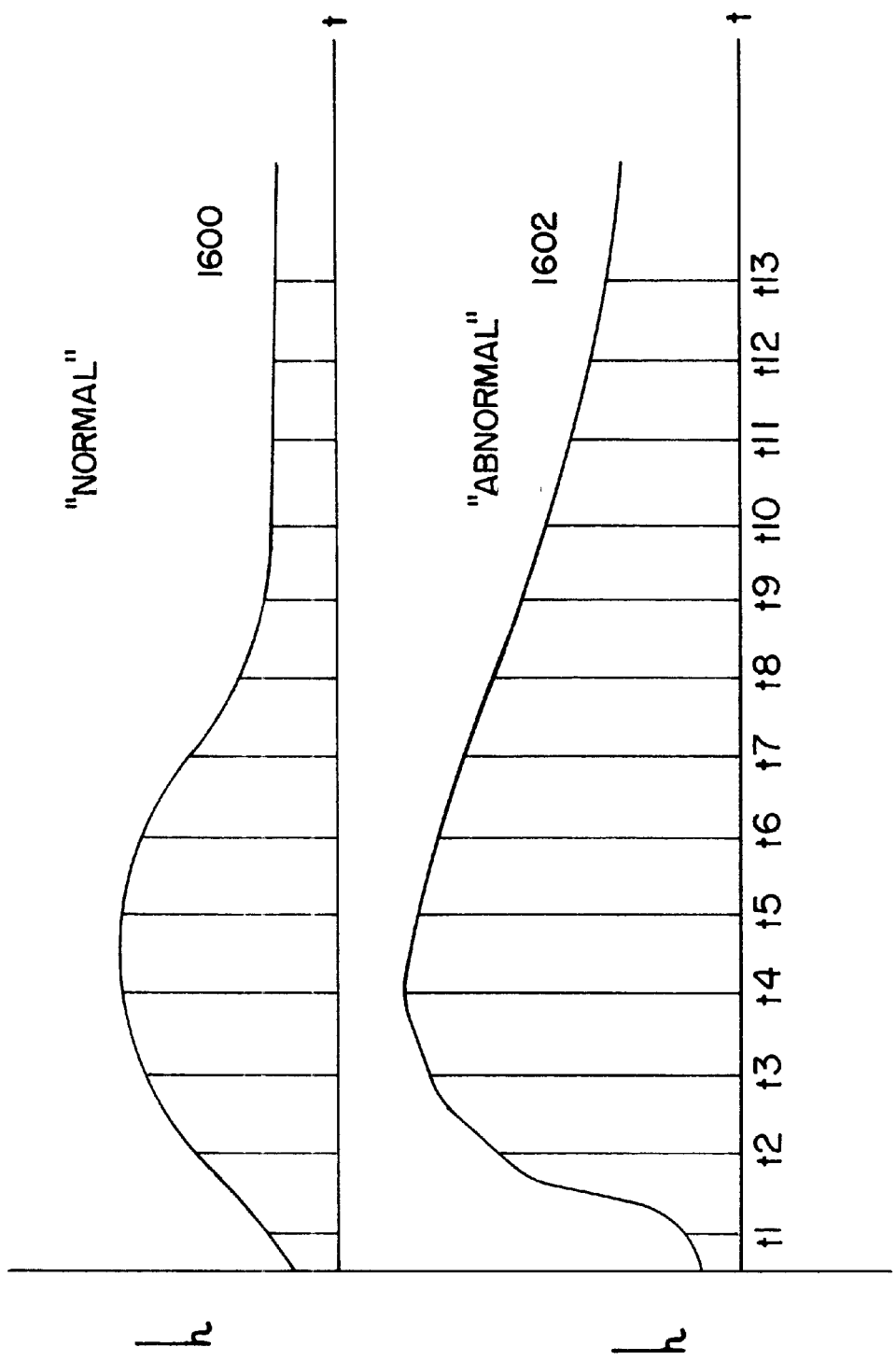
FIG. 16 illustrates timing diagrams for normal and abnormal fluid levels during a flushing cycle.

If the drain 908 of the urinal 900 becomes blocked, for example with litter 910, the fluid level sensor 904 may detect that the level of water in the urinal 900 is unusually high. Additionally, the water level may not behave, e.g. fall and rise during a flushing cycle, in the manner associated with normal flushing conditions. The fluid level sensor 904 may detect such a departure from normal operation and the controller 912 consequently directs a warning signal to the user or to an attendant of the restroom. An example of a departure from normal operation is illustrated in FIG. 16. Each curve shows a measurement of fluid height in the urinal plotted against time during a flushing cycle. In the upper curve, 1600, normal flushing shows a slow rise in fluid height followed by a fall in fluid height. In the lower curve 1602, exemplary of abnormal flushing conditions where the drain of the urinal is partially blocked, the fluid height rises rapidly and falls slowly. A comparison of, for example, the maximum fluid height reached during the flushing cycle or the decay time to re-attain equilibrium level may be indicative of a partial blockage of the urinal. Once the controller has determined that the flushing characteristics are not normal, the controller may signal to a user using, for example, a sign beside the urinal, indicating to intended users that the urinal currently suffering a blockage should not be used. The controller may also signal to a maintenance attendant via, for example, a warning light on a control panel or a warning on a computer screen, indicating that a blockage in the particular urinal has been detected.

Figure 17:
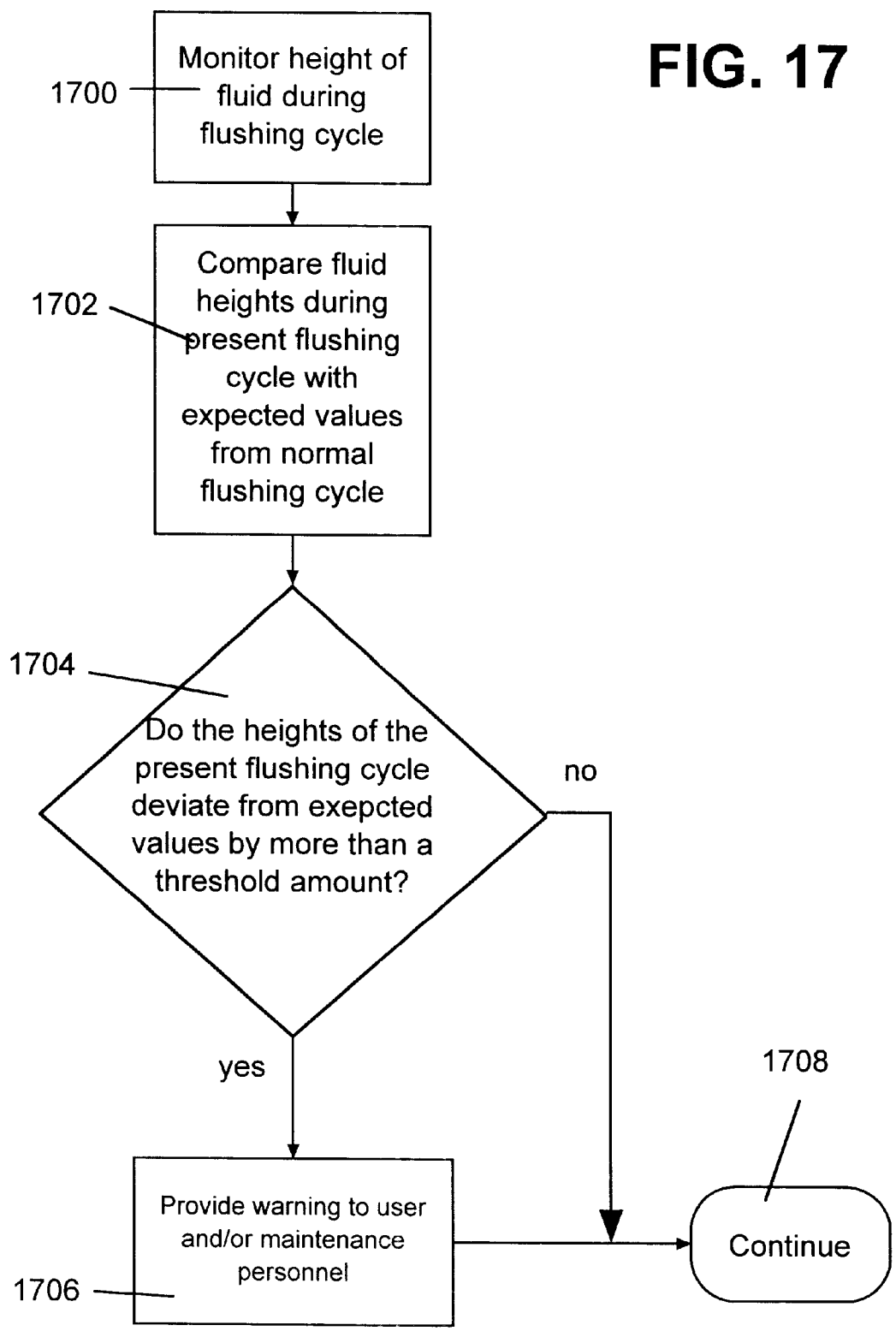
FIG. 17 illustrates steps used by a controller use to determine whether fluid levels during a flushing cycle are normal.

FIG. 17 illustrates steps that the controller may use to determine whether the flushing cycle is normal. The controller monitors the fluid level during the flushing cycle, in step 1700. The controller then compares, at step 1702, the measured fluid level, for example, sampled at different times t1, t2 . . . t13 throughout the flushing cycle as illustrated in FIG. 16. The controller then determines, at step 1704, whether the currently measured fluid levels deviate from the expected, "normal" levels by more than a predetermined threshold amount. If the deviation is greater than the threshold amount, the controller then sends a warning to the user and/or maintenance personnel, in step 1706.

A fluid level sensor may also be used to monitor the behavior of the water level in a toilet. As with a urinal 900 discussed hereinabove, a toilet fluid level sensor may be used to detect abnormal fluid level conditions, for example excessively high fluid levels if the toilet is blocked, or abnormal flushing levels if there is a partial blockage. The presence of such abnormal conditions may be indicated to a user or attendant, so as to prevent further use, and possible overflow, and indicate a need for maintenance.

Further, if the usual water level in the toilet is not set by the dam within the toilet trap, the fluid level sensor may be able to determine the amount of waste deposited in the toilet by a user, from the increased water level in the toilet after use. The controller may be configured to adjust the volume of water flushed through the toilet according to the volume of waste detected. This has the advantage that a reduced flush volume may be used where the waste volume is small, thus saving water. This also has the advantage that a single large flush may be used to remove large amounts of waste, where a user may previously have used two standard flushes.

Figure 10C:
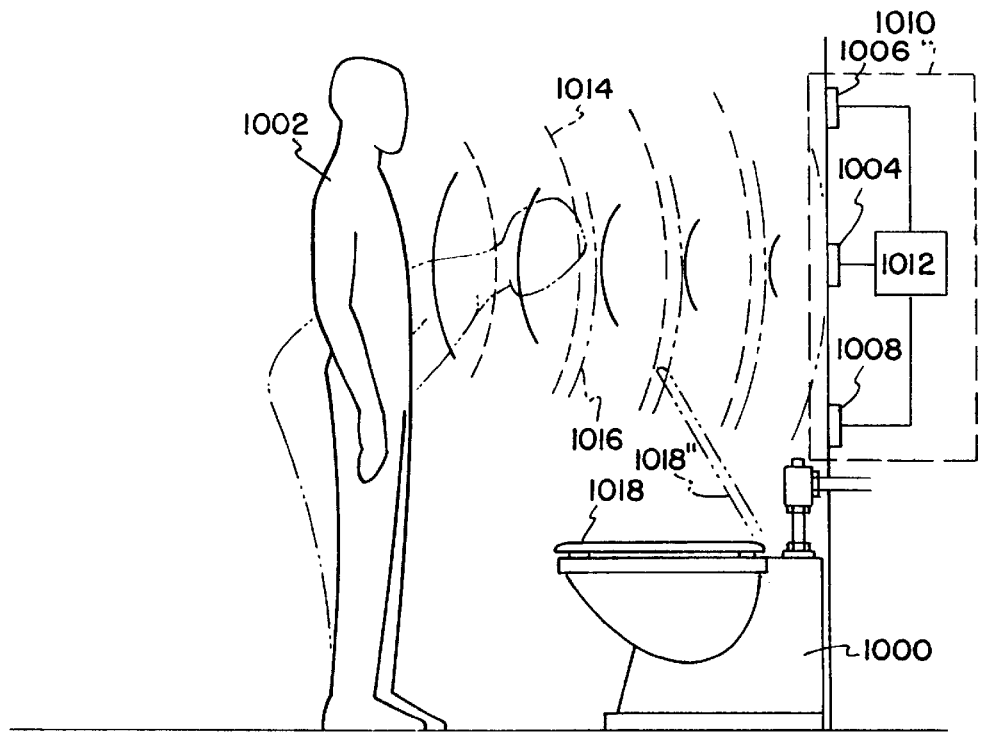
FIGS. 10A–10C illustrate the detection of a user's height and actions relative to a toilet.
Figure 10A:
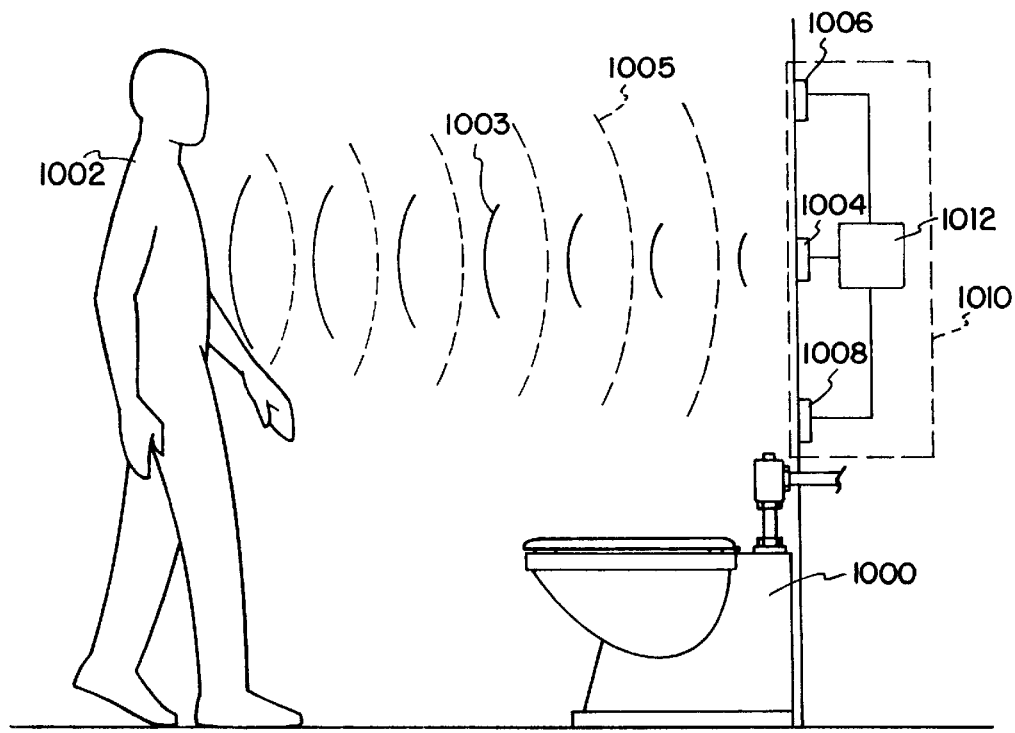
Figure 10B:
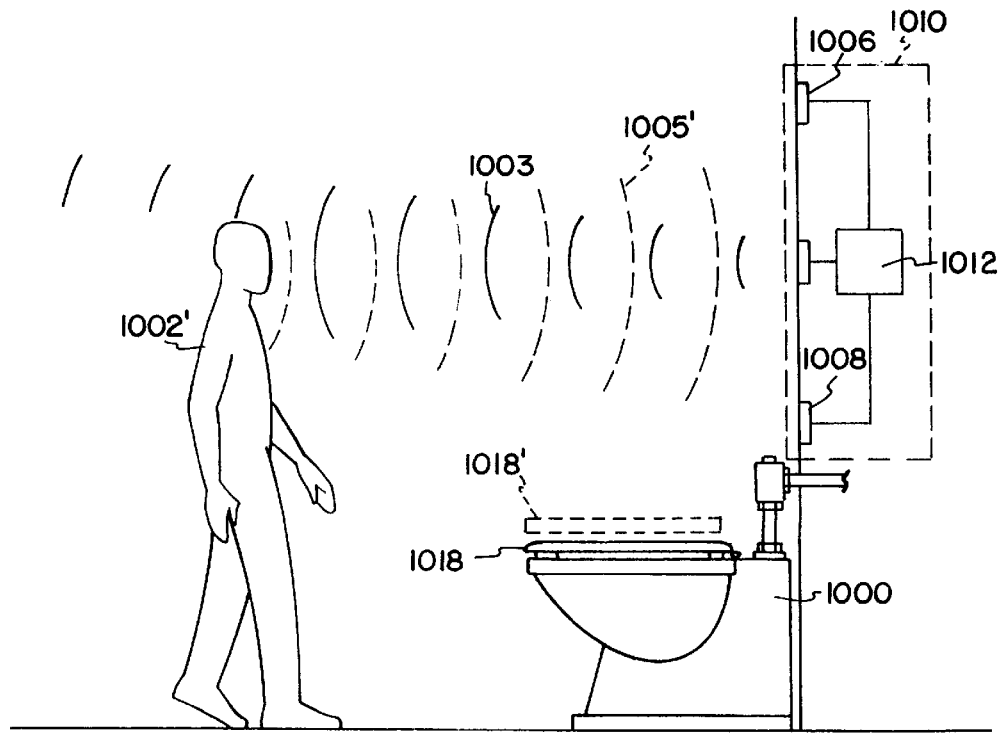

FIGS. 10A–10C illustrate another application where a number of active sensors are employed, in this case to determine a characteristic of the user. A special case is illustrated, where a single transmitter and two receivers are employed in a bistatic arrangement. Two or more independent active sensors may also be used, as will become apparent below.

In FIG. 10A, the transmitter is located in a toilet stall for controlling the operation of a toilet 1000. The user 1002 is illuminated by the transmitter 1004, and the upper and lower receivers 1006 and 1008 detect upper and lower reflected signals respectively. The control system 1010, including the transmitter 1004 and upper and lower receivers 1006 and 1008, and the controller 1012, determines an "upright" user position from signals received by the upper and lower receivers 1006 and 1008 when the user 1002 enters the stall. FIG. 10C illustrates "upright" signals 1014 received from the upright user 1002 as dashed returns.

If the user 1002 bends over to a position illustrated with double-dashed lines as illustrated in FIG. 10C, for example to remove clothing in preparation for using the toilet 1000, then the signals received from the bending user 1002 change from the "upright" signals 1014, to "bending" signals 1016. "Bending" signals may differ from the "upright" signals by having a reduced signal at the upper receiver 1006. Thus, the control system 1010 can determine a user's behavior and may distinguish between a user 1002 who is going to sit on the toilet 1000 from one who will stand by the toilet 1000 to use the toilet 1000 as a urinal. Accordingly, the control system 1010 may be able to prepare the toilet 1000 for different types of use by adjusting the position of the toilet seat 1018. For example, the toilet seat 1018 may have a default position that is down, and the toilet seat moves to a raised position (short-long dashed lines, 1018") if the control system 1010 determines that the user 1002 is not going to sit to use the toilet.

Also, the signal received by an active sensor may depend on the height of the user. This situation is shown in FIG. 10B, in which a short user 1002' approaches the toilet 1000. As is apparent after comparison with FIG. 10A, the signals 1005' reflected by the short user 1002' are different from the signals 1005 reflected by the larger user 1002. Thus, if the control system 1010 is configured to compare a reflected signal 1005' with a "standard" for an adult, it may be able to determine the height of a user 1002 and 1002'. Similarly, the control system may also be able to recognize users who are taller than the "standard" height.

The controller may adjust aspects of the washroom fixture according to the height of the user thus detected. For example, if the toilet, or toilet seat, were to be height adjustable, then its height could be set according to the detected height of the user. Thus, if a tall user were detected, the toilet, or toilet seat, could be adjusted to be in a high position 1018'. Likewise, if the user were detected to be short, then the toilet or toilet seat could be adjusted to be in a low position. Also, if the system detected the presence of a wheelchair, for example by detecting a moving user, having, a relatively low height and occupying more than one detection zone, thus having a greater length than a walking user, then the toilet seat height may adjusted.

Figure 20:
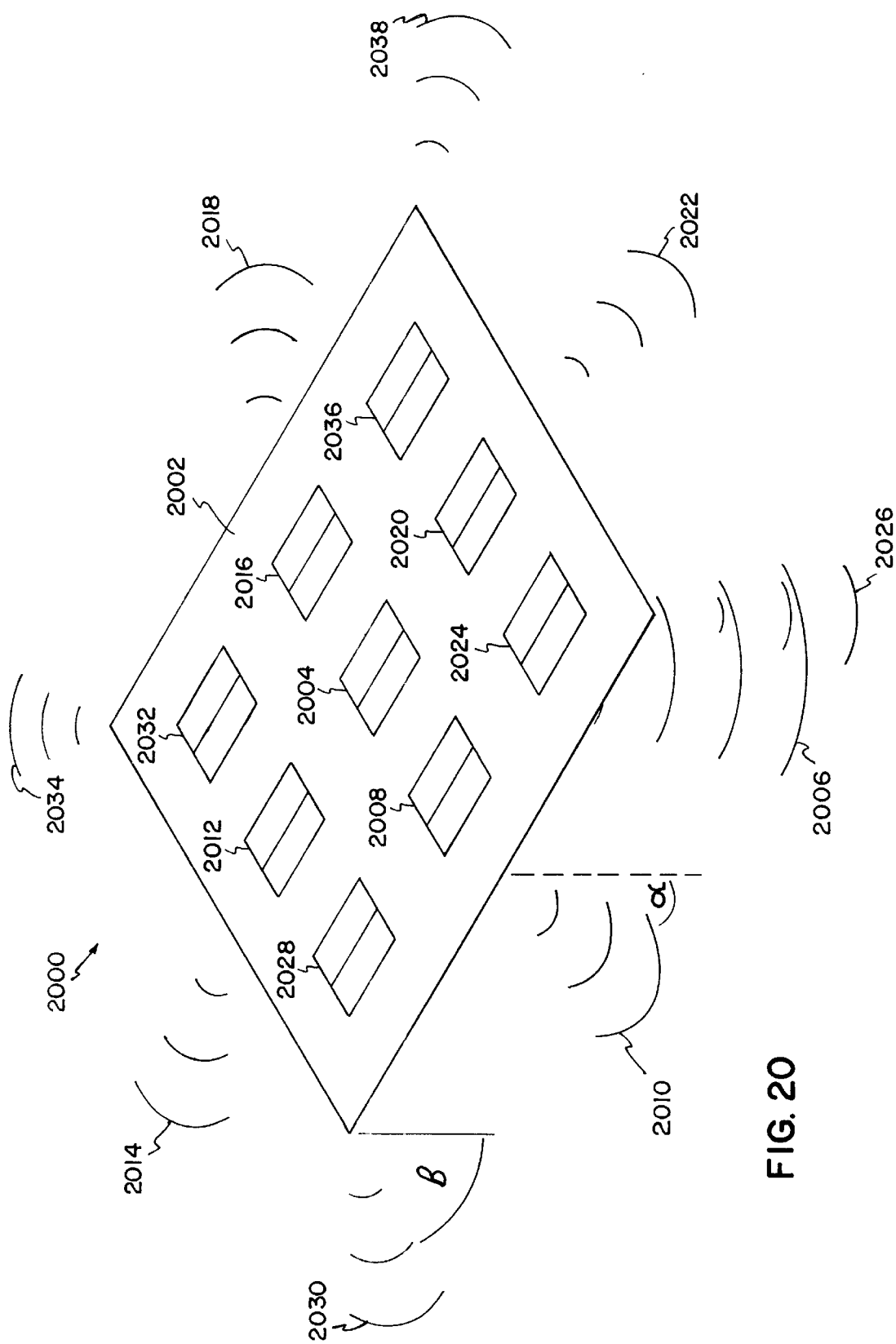
FIG. 20 illustrates an embodiment of a multi-sensor array.

An embodiment of a sensor array that may be used for determining height and/or position of a user is illustrated in FIG. 20. The sensor array 2000 is provided as a panel 2002, that may be suitable, for example for mounting in the ceiling or wall of a washroom. In this particular embodiment, the sensor array 2000 includes a square array of nine radar sensors, arranged in a 3×3 array, where each sensor is equipped for transmitting and receiving signals. The sensors are arranged so that the radar beams transmitted from the array are not all parallel. The center sensor 2004 directs a beam 2006 that is substantially perpendicular to the panel 2002. The sensors 2008, 2012, 2016 and 2020, arranged in the center of each panel edge are oriented so that each beam 2010, 2014, 2018 and 2022 transmitted by each respective sensor is directed with an angle, α, between the transmitted beam and a perpendicular to the panel 2002. Each beam 2010, 2014, 2018, and 2022 is, therefore, directed at an angle α from the center beam 2006. The sensors 2024, 2028, 2032 and 2036 arranged at the corners of the panel 2002 are also oriented so that their respective beams 2026, 2030, 2034, and 2038 are directed at an angle, β, from a perpendicular to the panel 2002. Thus, each beam 2026, 2030, 2034, and 2038 is directed at an angle β from the center beam 2006. The angle β may be the same as the angle α, but this is not a necessary condition. The peripheral sensors 2008, 2012, 2016, 2020, 2024, 2028, 2032 and 2036 are oriented away from the center sensor 2004 so that the panel 2002 senses, in the far field, a volume whose cross-sectional area is significantly larger than the size of the panel 2002. One may consider that each beam 2006, 2010, 2014, 2018, 2022, 2026, 2030, 2034, and 2038 covers a detection zone within the total detection volume of the multi-sensor array.

It will be appreciated that a multi-sensor array may have a different number of sensors, and the geometrical arrangement of the sensors may also be different from that shown. For example, a multi-sensor array may be formed from 18 sensors arranged in a 6×3 array.

Figure 21A:
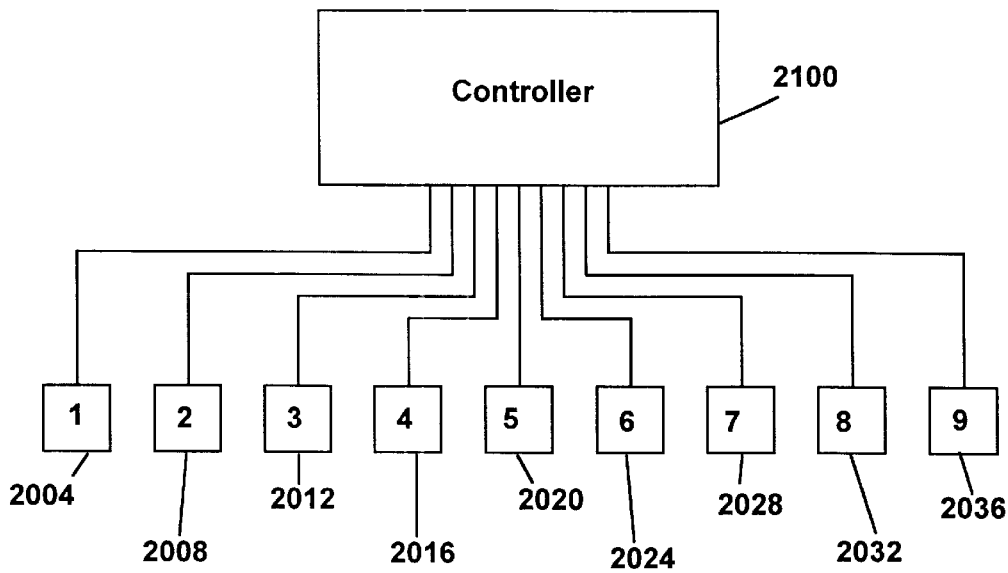
FIG. 21A illustrates an embodiment of a control architecture for the multi-sensor array of FIG. 20.
Figure 21B:
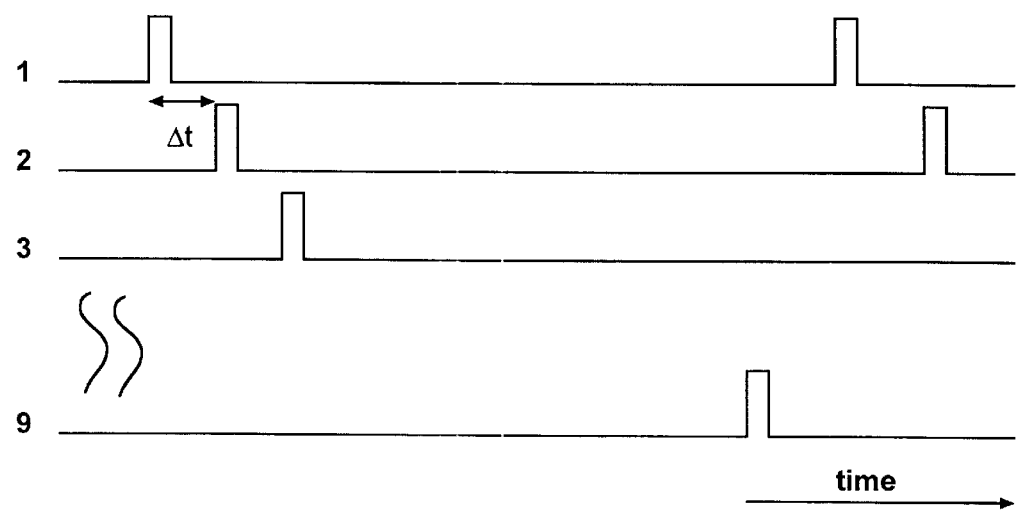
FIG. 21B illustrates a control timing diagram for multiplexing the sensors of the multi-sensor array of FIG. 20.

An embodiment of a control system for the multi-sensor array 2000 is illustrated in FIG. 21A. A controller 2100 is connected to the each of the sensors 2004, 2008, 2012, 2016, 2020, 2024, 2028, 2032, and 2036. The controller 2100 directs a trigger signal to each sensor 2004, 2008, 2012, 2016, 2020, 2024, 2028, 2032, and 2036 in turn, as illustrated in FIG. 21B, so that the sensors are time-multiplexed. After being triggered, the sensor operates for a short time, for example transmitting a probe signal, or a burst as described above with respect to the low power embodiment of the radar sensor. After the sensor has completed a cycle of transmission and detection, the next sensor in sequence is triggered. The time between triggering consecutive sensors, Δt, is longer than the time to complete a transmit/receive burst.

The controller 2100 accumulates the reflection data produced by the sensors 2004, 2008, 2012, 2016, 2020, 2024, 2028, 2032, and 2036. Since each sensor 2004, 2008, 2012, 2016, 2020, 2024, 2028, 2032, and 2036 probes a separate portion of the total volume sampled by the sensor array, the controller is able to determine the height, width, length (for example a wheel-chair) and location of the user. It will be understood that determinations having increased accuracy are available using larger numbers of sensors, but at the cost of increased complexity and expense.

Figure 22:
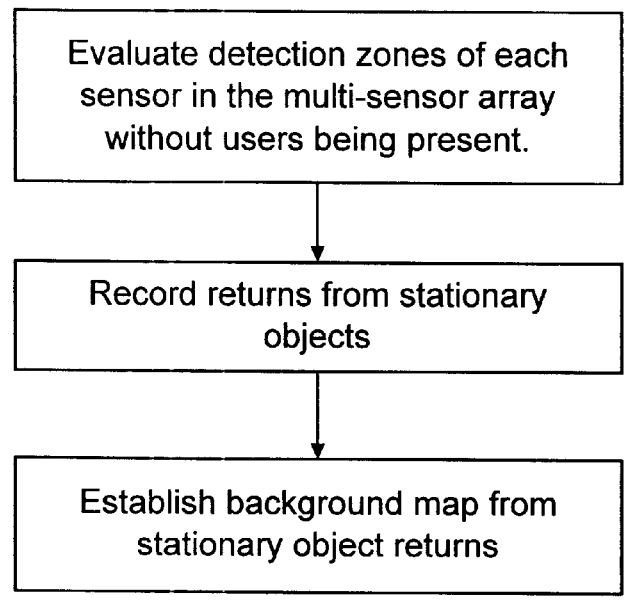
FIG. 22 illustrates steps in a learn mode of the multi-sensor array-based system for determining a background.
Figure 23:
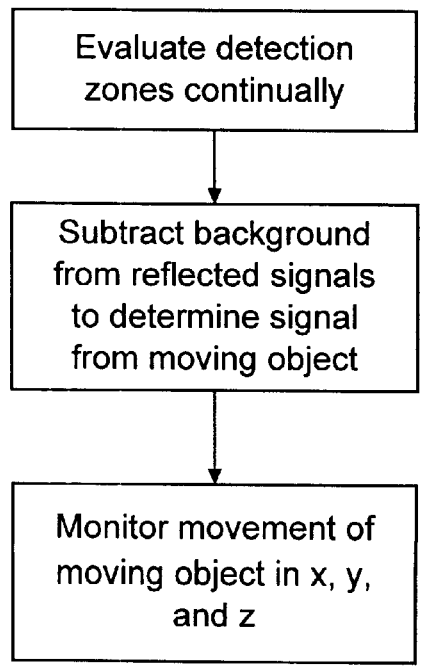
FIG. 23 illustrates steps in a detection mode of the multi-sensor array-based system for detecting an object.

A method of operating the multi-sensor array is illustrated in flow-chart form in FIGS. 22 and 23. The flow chart shown in FIG. 22 illustrates a learn mode for the sensor array 2000. Each detection zone for each sensor is evaluated, at step 2200, without users being present. The reflected signals correspond to the background signals from stationary objects within the washroom, such as the floor, walls, toilets, partitions and the like. These reflected signals are recorded, at step 2202, and a background map is established, at step 2204, from the reflected signals.

The flow chart in FIG. 23 illustrates steps taken during a detection mode for the multi-sensor array. The detection zones for each sensor are monitored at regular intervals, step 2300. The background signal is subtracted from the reflected signals, so as to remove the effect of the stationary objects, at step 2302. Any remaining signal arises from an object that has moved into one or more of the detection zones of the multi-sensor array 2200. The signal arising from the moving object is monitored as it moves, at step 2304. For example, the movement from one detection zone into the next may be monitored, i.e. movement in the x-y plane. Also, the range to the reflecting surface of the UWB pulses may be monitored, so that the height of the moving object may also be monitored. Thus, the array permits movement of the moving object to be monitored in three dimensions, namely x, y, and z.

Figure 24:
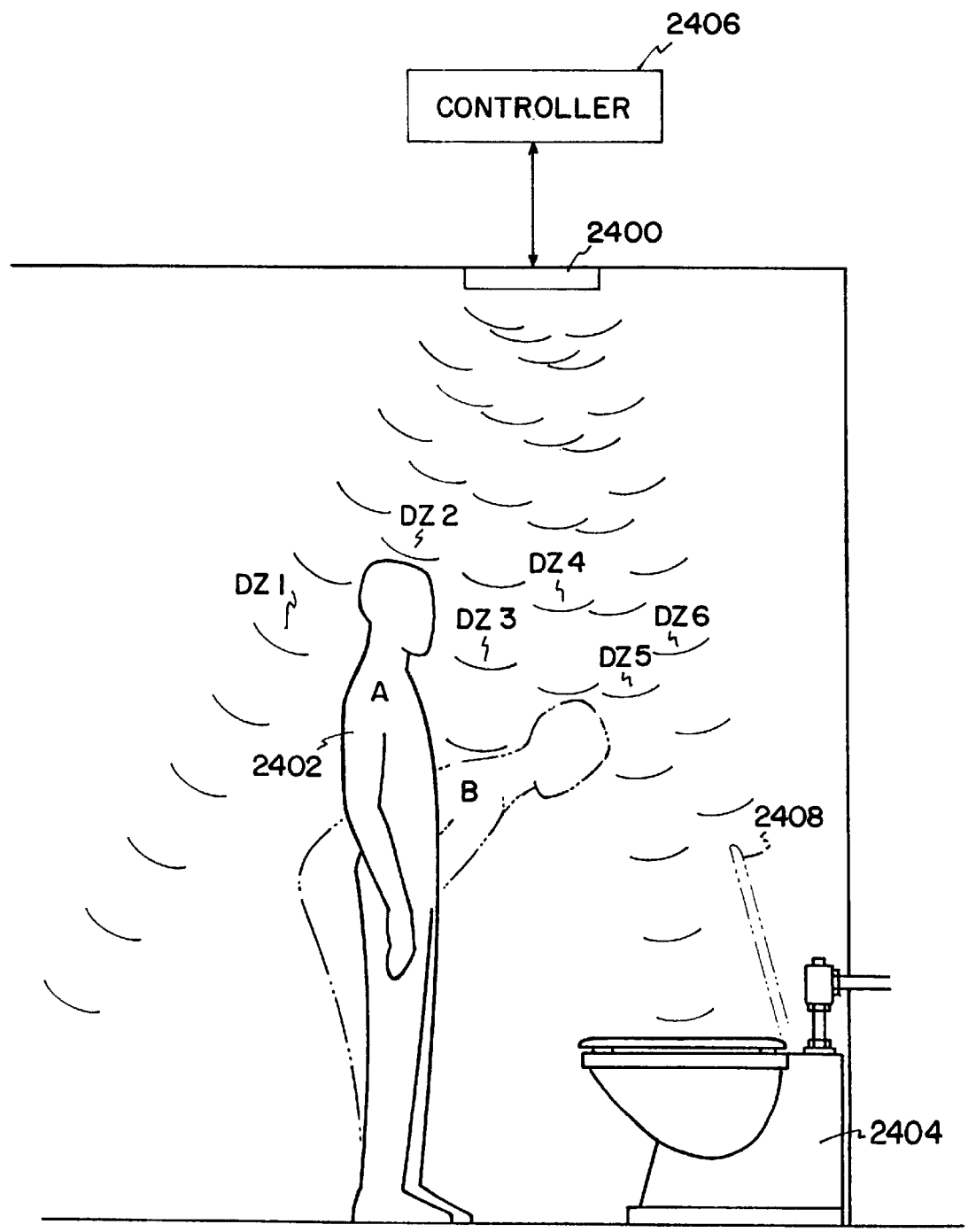
FIGS. 24 and 25 illustrate examples of how a multi-sensor array-based system may be used to detect a user moving with respect to a plumbing fixture.

An example of how the detection scheme operates is described in relation to FIG. 24. In this example, a multi-sensor array 2400 is provided in a toilet, the multi-sensor array 2400 generates a number of detection zones, including DZ1, DZ2, DZ3, DZ4, DZ5 and DZ6. In the arrangement shown, the detection zones cover different volumes progressively from left to right in the figure. When the user 2402 approaches the toilet 2404, he first enters DZ1. The controller therefore detects the height of the user 2402 in DZ1, and monitors that DZ1 has been entered. Thus, information in the three dimensions x, y, and z is recorded. As the user 2402 approaches the toilet 2404 more closely, the controller 2406 detects movement of the user 2402 from DZ1 to DZ2. At this point, the user 2402, in position A, is upright and in DZ2. The controller also detects that the user's height has not changed. The user 2402 may then stop in DZ2 and bend over, for example to undo clothing before using the toilet. When the user bends over, for example the user 2402 adopts position B, his head enters into DZ4 and torso enters DZ3, both of which are detected by the controller 2406. In addition, the height of the user has changed: when he first entered DZ2, he was detected as having a certain height, but after bending over he is shorter. Thus, the sequence of detection data that the user 2402, who used to occupy, for example, only one detection zone, DZ2, now occupies three detection zones DZ2, DZ3 and DZ4, plus the fact that his height has reduced, may be analyzed by the controller 2406 to mean that the user is bending over. The controller may be programmed to perform an operation upon detecting that the user 2402 bends over, such as adjusting the toilet seat 2408 position or height.

The sequence of the user's intrusion into the different detection zones may be summarized as follows, where the term "condition" refers simply to the (zone entered, height detected) information for each of the zones entered by the user.

| User's position | zones entered | relative height | condition |
|---|---|---|---|
| A | DZ2 | high | 1 |
| B | DZ2 | lower | 2 |
|   | DZ3 | lower than in 1 higher than in 2 | 3 |
|   | DZ4 | lower than in 1 higher than in 2 higher than in 3 | 4 |

The controller may be programmed to determine that this sequence of intrusion into different zones and related height measurements indicates that someone has entered the toilet and is bending over in the direction of the toilet bowl.

Figure 25:
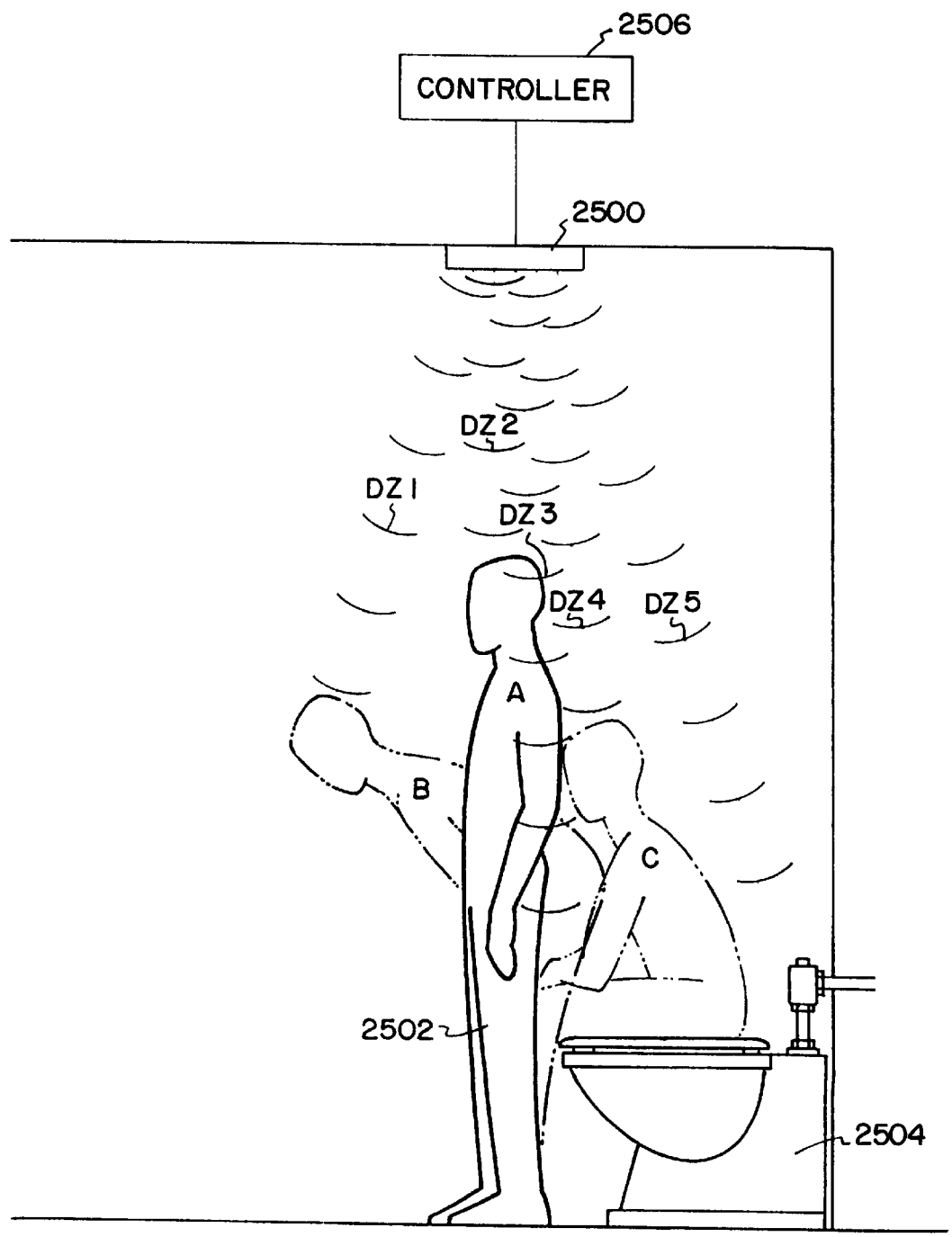

In another example of detecting movement by a user, consider the situation in FIG. 25 where a user 2502 is preparing to sit on the toilet seat. The user approaches the toilet by walking through DZ1 to DZ2, where he stops and turns round, adopting position A. Up to this point, the controller 2506 has detected a user of constant height moving from DZ1 to DZ2. As he sits down, the user passes typically passes through position B, where his head, at a height lower than in position A, enters DZ1. The user's back is in DZ2, and forms a reflecting surface that is lower in comparison with his head in position A. upon sitting down on the toilet, 2504, the user's head enters DZ4 at a lower height than in position A, while his body and legs are in DZ3, again at heights lower than his head in position A.

The sequence of the user's intrusion into the different detection zones and the different heights may be summarized as follows:

| User's position | zones entered | relative height | condition |
|---|---|---|---|
| A | DZ2 | high | 1 |
| B | DZ1 | lower than in 1 | 2 |
|   | DZ2 | lower than in 1, 2 | 3 |
| C | DZ3 | lower than in 1, 2, 3, 5 | 4 |
|   | DZ4 | lower than in 1 similar to 2 higher than in 3, 4 | 5 |

Thus, the controller 2506 may be programmed to recognize that this sequence of incursions into the different detection zones and the related height measurements indicates that a user 2502 has sat down on the toilet bowl 2504.

Other signatures may also be programmed into the controller for detection, such as a user kneeling at the toilet bowl, lying on the ground, approaching and standing at a urinal or washbasin, or bending over while sitting on the toilet bowl.

The multi-sensor array 2000 may be positioned at different places within a washroom, such as over the entrance, and close to the toilets and urinals. The entire washroom may be covered by multi-sensor arrays 2000, so that complete coverage of the washroom is possible. For example, a user may be tracked entering the washroom, using the facilities and leaving by tracking his passage from one detection zone to the next, including passing from the detection zone of one multi-sensor array to a detection zone of a second multi-sensor array.

The multi-sensor array 2000 may used to detect abnormalities, or temporary, stationary objects, such as trash on the floor, an overflowing toilet, or water on the floor. This is achieved by determining that no user is present in the washroom, or at least present in the area of the washroom of interest, while also determining that the background signal has altered from the mapped background signal produced in step 2204. The difference between the mapped background signal and the presently detected signal without users being present may be attributable to a temporary stationary object being present in one of the detection zones, such as trash, water on the floor or an overflowing toilet.

The information gathered from the multi-sensor array may be used in the operation or activation of different fixtures and appliances within the washroom. For example, the length and height of a user entering the washroom may indicate that the user is in a wheelchair, and the controller may adjust the height of fixtures, toilet seat and the like accordingly. Also, the controller may be programmed to determine an estimated age range from a user's height, and control such features as the toilet or wash basin height, water level in a bath tub or water temperature accordingly.

It will be appreciated that other arrangements of multi-sensor array may be used. For example, a multi-sensor array may be formed from having a single transmitter surrounded by a number of receivers.

The height of users may be detected by other active sensors, and height detection is not restricted to active sensors used with toilets. Thus, other fixtures may be also adjusted in response to the detected height of the user. For example, height detection information may be provided along with information regarding a user's approach to a faucet. Thus, the temperature of water delivered from the faucet may be reduced when a shorter user is detected, since shorter users tend to be younger, and less able to withstand hot water. Also, the height of a faucet may be automatically adjustable according to the detected height of the user. This, for example, reduces the amount by which a tall user has to bend over to use a faucet.

The embodiment illustrated in FIGS. 10A–10C may also determine when a user is bent over the toilet bowl 1000, for example by detecting a first height for the user 1002 as the user 1002 enters the stall, and detecting the user's height at subsequent times. Under normal operation, the user's height either does not change during use, for example the user 1000 stands next to the toilet 1000, or sits on the toilet 1000. The radar 1004 may also detect when the user 1002 is bending over the toilet 1000, which may require the radar 1004 to include a transmitter at a level close to the level of the toilet 1000. Such a radar unit may be able to determine whether the user 1002 is a child whose head is stuck or being held in the toilet. If such a determination is made, the controller 1012 may empty water from the toilet 1000 in order to prevent the user from drowning.

A radar unit on a wash basin may similarly detect the height of a user, and determine whether the user has his or her head bent over into the sink and is in danger of drowning. If such a determination is made, the faucet could be shut off and the sink drained in order to avoid any drowning accident.

Additionally, an active sensor may be able to determine the presence of a wheelchair, since a user in a wheelchair moves more smoothly than a user who is walking, and has a greater "length" as measured by the multi-sensor array. The controller may adjust fixtures in response to a detected wheelchair, such as raising a toilet or toilet seat height to a selected level for wheel chair users.

Figure 11:
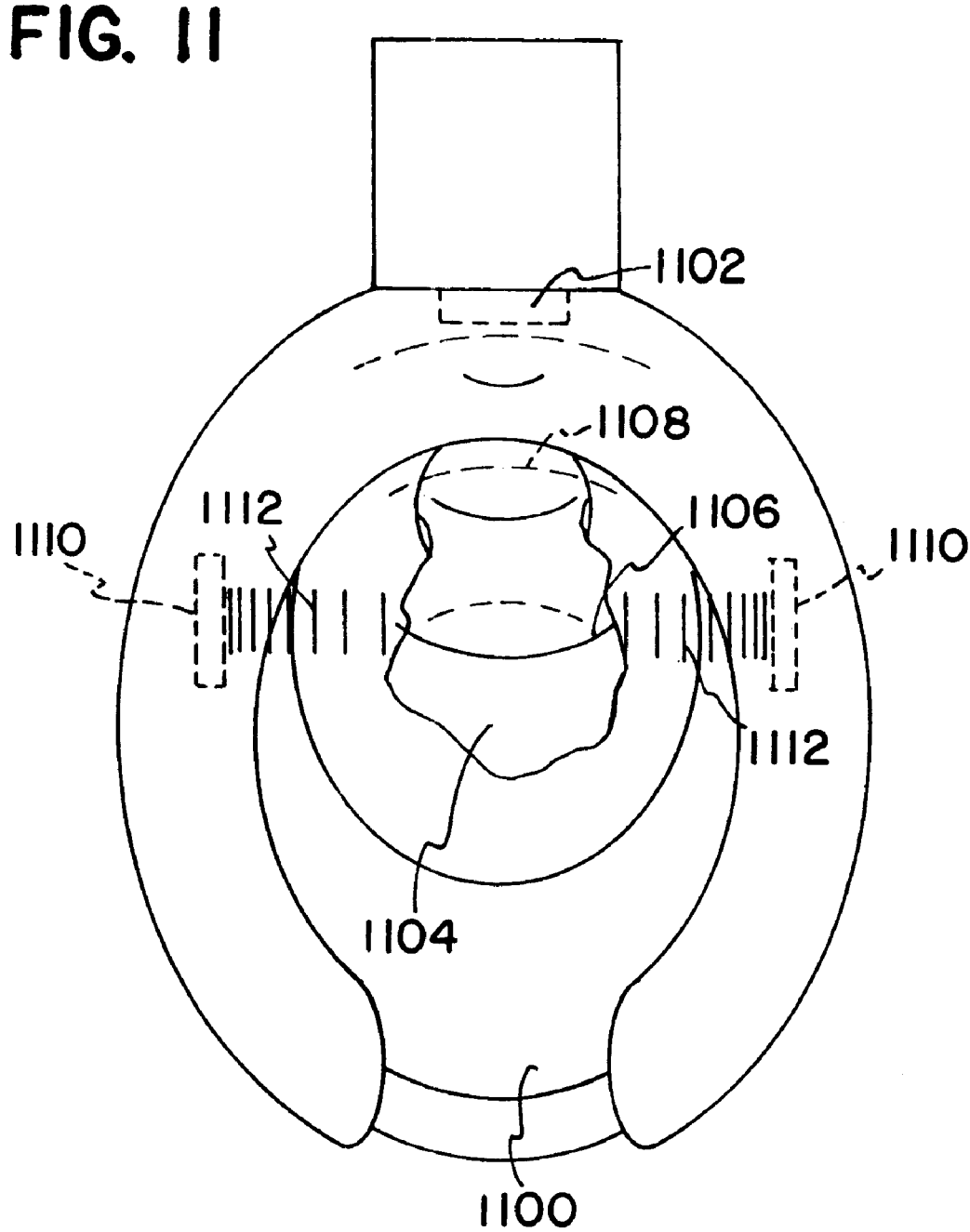
FIG. 11 illustrates a toilet equipped with an active sensor and ultrasonic generators.

Another combination of sensors is illustrated in FIG. 11. A toilet 1100 is provided with two active sensors, the first (not illustrated) is a user sensor, and may be any of the user sensors applicable to controlling toilets as described hereinabove, for example to detect movement towards and away from the toilet. The second is a sensor 1102 for detecting the contents of the toilet 1100. The contents sensor 1102 illustrated is an ultrasonic or optical sensor to detect solid matter 1104 in the toilet 1100. The contents sensor 1100 measures the size of the solid matter 1104 by transmitting a probe signal 1106 and detecting a return signal 1108. This may be performed in more than one dimension in order to increase the accuracy of the size measurement. From the measured size of the waste, the controller (not illustrated) connected to both of the sensors, may be able to determine the volume of water required to flush the waste 1104. Thus, if it is determined that there is a small amount of waste 1104, then the volume of water used to flush the waste 1104 may accordingly be small. However, it may be determined that there is a large amount of waste 1104 in the toilet 1100. The controller may then decide to flush with a large flushing volume. The controller may be provided with a look-up table to determine the amount of fluid to be used in a flush, based on the measured volume of waste 1104 in the toilet 1100. Additionally, the controller may determine that ultrasonic bombardment of the waste is required, in order to break the waste 1104 up prior to flushing and thus avoid a possible blockage. The controller then activates one or more ultrasonic generators 1110 that generate ultrasonic waves 1112 of sufficient power to break the waste up prior to flushing.

Additional information, of interest to management or controlling authorities, may be gathered where a number of active sensors are used in a restroom or bathroom setting. Consider the example illustrated in FIG. 12A, of three urinals 1200, 1202, and 1204 positioned along a wall 1206. Each urinal is provided with an active user sensor 1208, 1210, and 1212 for detecting the presence or motion of a user close to its respective urinal 1200, 1202 or 1204, in a manner described hereinabove. The sensors 1208, 1210, and 1212 are each connected to a central controller 1214 that gathers data generated by each of the user sensors 1208, 1210, and 1212. The first user sensor 1208 detects the presence of a user 1216 when he walks by the first urinal 1200. However, since the user 1216 does not remain in the detection zone of the first urinal 1200 for a sufficiently long period of time, he does not trigger a flushing. The user 1216 walks in the direction of the arrow 1218 to reach a second position 1220 in front of the second urinal 1202, where he is detected by the second user sensor 1210.

The detection of the user at positions 1216 and 1220 by user sensors 1208 and 1210 is transmitted to the controller 1214. The controller 1214 may then deduce that a user is walking past the first and second urinals 1200 and 1202. Thus, it is possible to monitor the movements of a user passing the urinals 1200, 1202, and 1204. With the use of additional sensors, located by wash sinks, toilets, or simply mounted on a wall to detect a user, it may be possible to monitor the movement of a user throughout the entire restroom. Such a situation is illustrated in FIG. 12B. An advantage of being able to monitor movement of users throughout a restroom using active sensors such as radar or laser radar is that unobtrusive monitoring may take place to provide washroom status information. This avoids the use of more obtrusive methods, such as a video camera, which users of the restroom may find objectionable because of a lack of privacy.

FIG. 12B illustrates a restroom 1222 equipped with a number of active sensors, with a central controller 1224 to gather and analyze information on the activities and events occurring in the restroom 1222. The restroom is equipped with three urinals 1200, 1202, and 1204, with respective active user sensors 1208, 1210 and 1212, three toilets, 1226, 1228 and 1230 having respective user sensors 1232, 1234 and 1236, and two wash sinks 1238 and 1240 equipped with respective user sensors 1242 and 1244. The user sensors 1208, 1210, 1212, 1232, 1234, 1236, 1242 and 1244 are typically adapted for controlling their respective washroom devices. Additionally, two active user sensors 1246 and 1248 may be provided on the side walls for surveying the restroom 1222, and are not associated with any particular washroom device. It will be appreciated that the number and placement of sensors in a washroom may be different from that illustrated, and that the example is for illustrative purposes only. For example, only one urinal 1204 is illustrated as having a fluid level sensor 1250 connected to the controller 1224. However, other urinals, toilets and wash sinks may also be provided with fluid level sensors for informing the controller 1224 of fluid levels and fluid level behavior in their respective washroom devices. A men's restroom has been used for illustrative purposes because it includes all of the plumbing fixtures found in commercial restrooms. It will be appreciated that a restroom for women may be similarly equipped, but without the urinals. Also, the restroom may be equipped with one or more sensor arrays for monitoring movement throughout the restroom.

The controller 1224 may be used to control the operation of the fixtures in the restroom. One reason for controlling the fixtures is to prevent problems from low water pressure. When many fixtures are located in the same area, and operate off the same water supply, the controller may be used to prevent too many fixtures from flushing at the same time and thus causing a temporary drop in the water supply pressure. The controller 1224 may receive a flushing signal from a fixture, indicating that the fixture is about to flush. The controller 1224 may then apply flush-prevent signals temporarily to other fixtures located in the same area so as to prevent them from flushing until the first fixture, or a certain maximum number of fixtures, has finished flushing. Stand alone systems, operating through wire or wireless communications channels may communicate that the respective fixture is flushing.

Additionally, the water supply may be fitted with a pressure sensor, the output of which is monitored by the controller. The controller may be programmed to instruct the toilets and urinals to flush for longer or shorter periods depending on whether the water line pressure is lower or higher respectively.

Figure 12A:
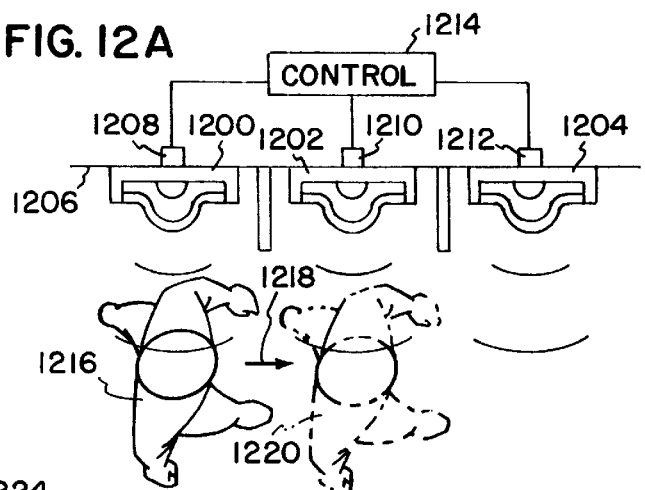
FIG. 12A illustrates the detection of a user's motion through a washroom by a number of active sensors.
Figure 12B:
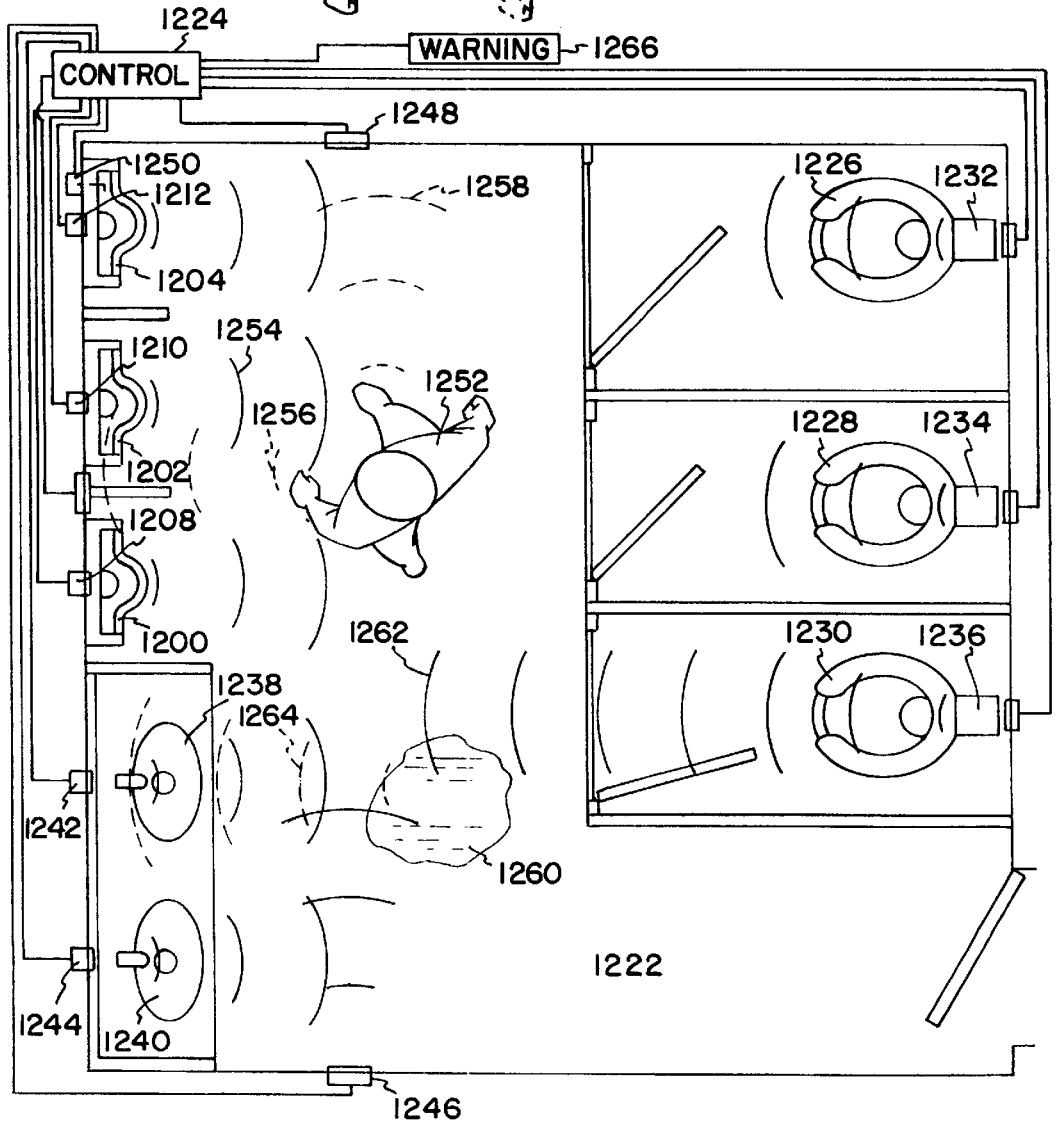
FIG. 12B illustrates a washroom having a number of fixtures provided with active sensing.

By gathering information from each of the user sensors 1208, 1210, 1212, 1232, 1234, 1236, 1242, 1244, 1246 and 1248, the controller 1224 may be able to follow the path of a user as he enters the restroom 1222 and moves from the sensor field of one user sensor 1208, 1210, 1212, 1232, 1234, 1236, 1242, 1244, 1246 and 1248 to the next, in a manner similar to that described in relation to FIG. 12A. Furthermore, the user sensors 1208, 1210, 1212, 1232, 1234, 1236, 1242, 1244, 1246 and 1248 may be adapted to recognize reflected signals that were generated by other user sensors 1208, 1210, 1212, 1232, 1234, 1236, 1242, 1244, 1246 and 1248, for example by having the controller 1224 control the user sensors 1208, 1210, 1212, 1232, 1234, 1236, 1242, 1244, 1246 and 1248 to transmit at different times and direct the detection portion of each user sensor 1208, 1210, 1212, 1232, 1234, 1236, 1242, 1244, 1246 and 1248 to detect signals generated by the other user sensors.

To illustrate, consider a situation where the controller 1224 directs the second urinal sensor 1210 to transmit a probing pulse 1254 (solid line wavefronts). At the same time, the controller 1224 directs the other user sensors 1208, 1212, 1232, 1234, 1236, 1242, 1244, 1246 and 1248 to look for a reflected pulse originating from the probing pulse 1254. The user 1252 generates a reflected pulse 1256 that is detected by the second urinal sensor 1210. The user 1252 also generates another reflected pulse 1258 that is directed to, and detected by, the wall user sensor 1248. From the information received from the second urinal sensor 1210 and the wall user sensor 1248, the controller may be able to deduce the user's position within the restroom 1222 and his direction and speed, from a triangulation analysis and determining a rate of change of position. It will be appreciated that other user sensors may also contribute information regarding the user's position: for example the third urinal sensor 1212 may also receive a reflected signal from the user 1252.

The ability to track users moving through a restroom may be advantageous in situations where a large volume of traffic is possible, such as a restroom at a sports stadium or a convention center. For example, it may be useful for the controller 1224 to detect whether there are many users in the restroom and correlate the number of users with the rate of flushing. If the rate of flushing is too high for the number of users, then there may be something wrong with the control system, or there may be a child in the restroom playing at flushing as many devices as possible.

The use of a network of active user and fluid level sensors 1208, 1210, 1212, 1232, 1234, 1236, 1242, 1244, 1246, 1248 and 1250, and/or a multi-sensor array as described earlier, provides additional safety features which are not found in conventional restrooms, including the detection of puddles of liquid on the restroom floor, the detection of users who slip and fall, and pools of water on the floor.

FIG. 12B illustrates the detection of water on the floor of the restroom 1222. The first toilet sensor 1236 directs a probe signal 1262 in a direction generally towards the second basin sensor 1242. Under normal conditions, some of the probe signal 1262 may reach, and be detected by, the second basin sensor 1242. This is a normal signal, and may be used as a background signal. However, if there is a puddle of water 1260 present on the floor of the washroom 1222, then the second basin sensor 1242 may also see a signal 1264 reflected by the water 1260. Thus, the controller 1224 may be able to determine that the environment in the restroom 1222 has changed from normal. Additionally, the reflected signal 1264 from the water 1260 is relatively constant with time, so the controller 1224 may further distinguish that there is a hazard present in the restroom and transmit a warning to a warning panel 1266 for an attendant.

The controller 1224 may detect a difference in a number of reflected signals, indicating that a hazard such as a pool of water is present. For example, the second wall sensor 1248 may detect a different signal originating from the first wall sensor 1246 when a puddle of water forms.

Once a hazard, such as a puddle of water has been detected, the controller 1224 may then check all the valves that it controls to determine if any of them are faulty to determine the possible source of the puddle. Additionally, the controller may lock out access to an affected area, if possible. For example, if the puddle of water 1260 were located in a bathroom stall, the controller could lock the stall and prevent a user from accessing the affected stall.

Another safety feature is that the controller 1224 may be able to determine if a user slips and falls in the restroom. One or more of the sensors 1208, 1210, 1212, 1232, 1234, 1236, 1242, 1244, 1246 and 1248 may be bistatic, similar to that illustrated in FIGS. 10A–10C, and may be able to determine the height of a user 1252. If the user's height were determined to reduce from a first value to a second value and to remain at that value for a period of time, the controller may determine that the user 1252 has fallen, and send an appropriate message to the warning panel 1266. The controller 1224 may be programmed to make a determination that the user 1252 has fallen after a few seconds, for example 5 or more, have passed after the user's height reduced to the second value: this would prevent the determination of a user's fall when the user was only, for example, bending over to pick something up from the floor.

The network of sensors 1208, 1210, 1212, 1232, 1234, 1236, 1242, 1244, 1246 and 1248 may determine how many people enter a particular stall in the restroom 1222. This may be accomplished, for example, by detecting two people walking towards a stall and then detecting that the stall door is closed. Such behavior may be associated with an illegal activity, such as a drug deal or the like, and so a warning signal could be forwarded to an attendant that there is a possibility of an illegal activity in a stall. The determination of possible illegal activity could also involve the measurement of the length of time that the stall door is closed, in order to distinguish this activity over correct use of the stall by, for example, a father and small son.

Further, the controller 1224 may be adapted to monitor usage statistics of each restroom device, and compare these against normal usage. The detection of abnormal use rate may indicate a problem with that device or that there is something in the vicinity of that device that users are avoiding. For example, if someone had vomited on the second urinal 1202, the vomit may not be detected by the network of sensors directly. However, in this situation, users would tend to avoid the second urinal 1202 because of the vomit. The fact that users were underusing the second third urinal 1202 would be detected by the controller's statistical analysis of device usage, and the controller would be able to warn an attendant accordingly.

Figure 18:
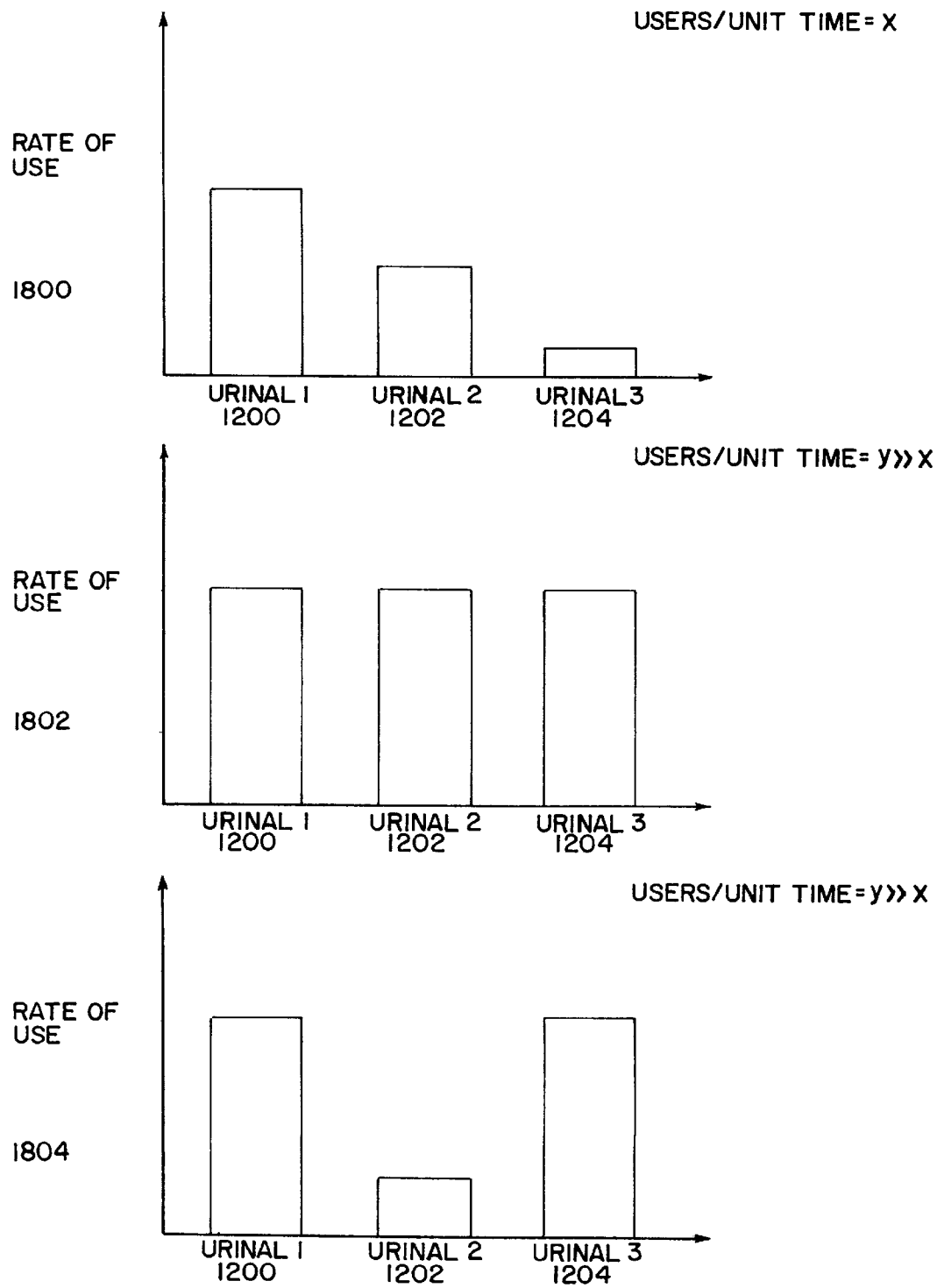
FIG. 18 illustrates examples of relative urinal usage rates under different total usage rates.
Figure 19:
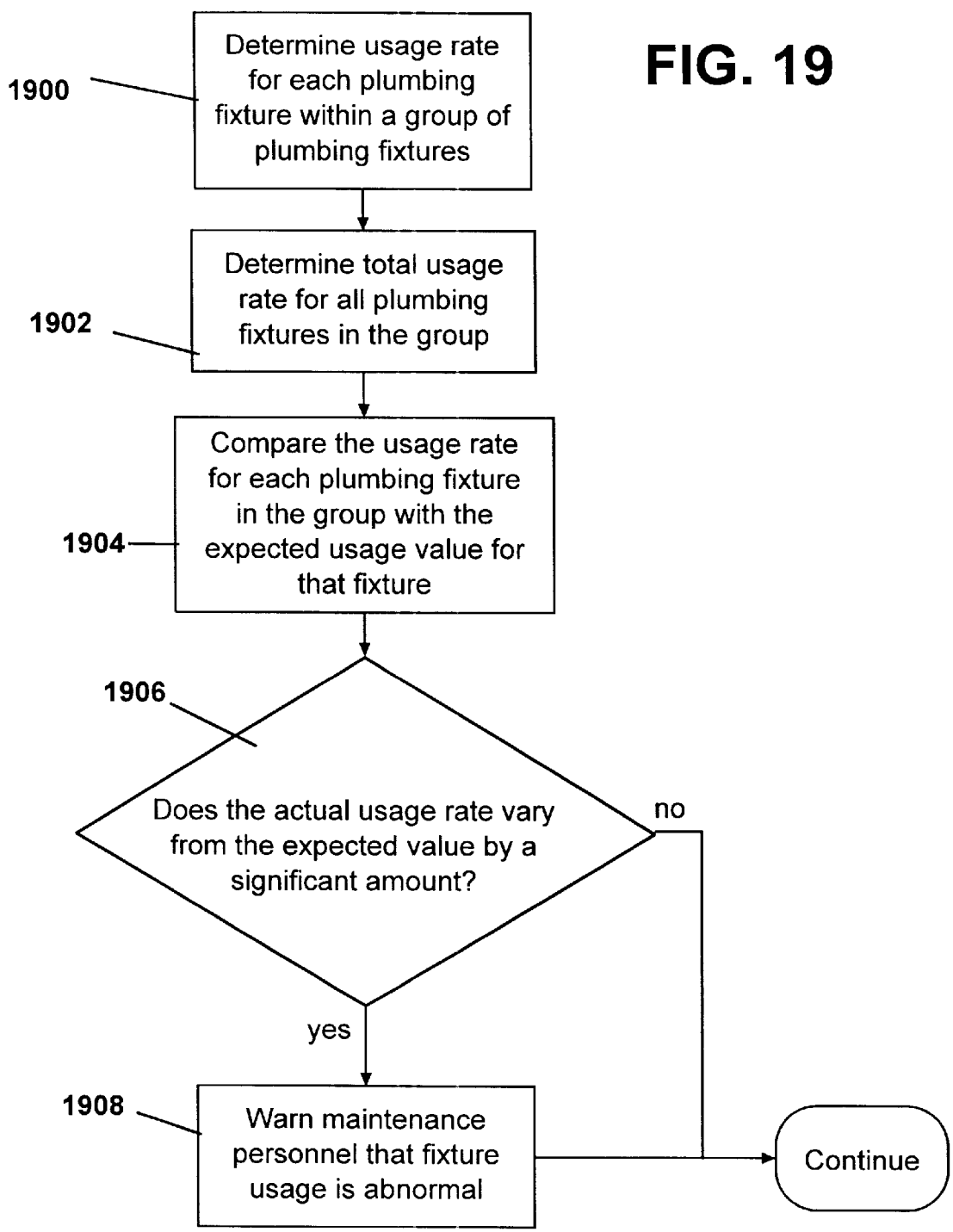
FIG. 19 illustrates method steps used in determining abnormal usage rate of a plumbing fixture.

FIGS. 18 and 19 illustrate one embodiment of a statistical analysis of device usage that may be used for detecting the underuse of a plumbing fixture, such as the second urinal 1202. The top chart 1800 in FIG. 18 illustrates the rate of usage for the three urinals 1200, 1202 and 1204, where the total user rate for all three urinals is given by X users per hour. In this example, the first urinal 1200 is used much more heavily than the second and third urinals 1202 and 1204, while the second urinal 1202 is used more heavily than the third urinal 1204. Such a situation may be explained, for example, by the fact that the first urinal 1200 is closest to the door and, all other things being equal, users tend to use the first available urinal they come to on entering the washroom. Hence, the rate of urinal use falls with increasing distance from the entrance to the washroom. However, in the second chart 1802, the total user rate for all urinals is Y, where Y>>X. Here, the usage of urinals is very heavy, and so the chances of the urinals closer to the door being used are higher for a new user who has just entered the washroom and the user has to use one of the other urinals. Hence, the rate at which each urinal is used is more or less equal. The first two charts 1800 and 1802 illustrate that it is possible to determine expected relative usage rates for each urinal, given a certain total usage rate.

The controller may be programmed, as illustrated in FIG. 19, to measure the rate of usage of the urinals 1200, 1202 and 1204, at step 1900, for example by counting the rate of flushing. The controller is also programmed to determine the total usage of all the urinals, step 1902. The controller then compares the actual usage rate for each urinal with the expected usage rate for the actual total usage rate, step 1904. When it is determined, at step 1906, that there is a significant deviation in urinal usage rate from the expected value, the controller may send notice of the abnormal usage rate to maintenance personnel, step 1908. For example, the controller may determine that the usage rates for the urinals 1200 1202 and 1204 are shown in chart 1804 where the total usage rate is still Y users per hour. The second urinal 1202 shows a usage rate substantially below that of the first and third urinals 1200 and 1204. This abnormal usage rate may be indicative of something wrong with the second urinal 1202, as would be the case had someone vomited on the second urinal. The controller may direct a warning to maintenance personnel that the usage rate of the second urinal 1202 is abnormal.

It will be appreciated that this is only an example of how the controller may operate to determine that an individual urinal, or number of urinals are not being used as would be expected. It will also be appreciated that such a determination may also be made for other groups of plumbing fixtures in the washroom, such as a group of toilets or a group of wash basins.

There are different approaches to distributing control functions within the restroom 1222 that fall within the scope of this invention. For example, a first embodiment of control distribution may allow the third toilet sensor 1232 to control flushing of the toilet 1226 independently of the controller 1224. In this embodiment, the third toilet sensor 1232 may direct a flushing signal to the controller 1224 to indicate that the third toilet 1226 is flushing. The controller 1224 may be adapted to direct a flushing over-ride signal to the third toilet 1226 to prevent flushing from taking place. The over-ride signal may be transmitted at any time, for example when the controller 1224 detects that there may be a blockage in the third toilet 1226 or if flushing at that moment may be ineffective due to a lack of water pressure.

In a second embodiment of control distribution, the third toilet sensor 1232 has less decision making capability than in the first embodiment and simply directs detector information to the controller 1224. The subsequent decision of when to flush the third toilet 1226 is made by the controller 1224. Thus, in this embodiment, the controller 1224 only directs flushing instructions to the third toilet 1226, and does not send any over-ride signals.

It will be appreciated that the systems for controlling restrooms and bathrooms described herein are applicable in many different types of setting. A restroom that includes active sensors for detecting users may be used in commercial settings, where a building has a number of restrooms, such as a sports stadium, or a commercial office building. Additionally, active sensors may be used in the control of bathrooms in private settings, such as in a house or apartment building. Hotels combine commercial and private settings, since a hotel typically has a number of private bathrooms in associated bedrooms or suites, and also has a number of public-style restrooms. The controller that controls the functions of FIG. 13 illustrates an architecture for centralized monitoring of restrooms and bathrooms. A central controller 1300 is connected to a number of restrooms and bathrooms. In the case illustrated, the central controller 1300 is connected to first and second restrooms 1302 and 1304, and first and second bathrooms 1306 and 1308. It will be understood that the central controller may be connected to more or fewer restrooms and bathrooms. The first restroom 1032 includes a restroom controller (RC) 1310, which serves a function similar to the controller 1224 in FIG. 12B. The RC 1310 directs information and warning signals to the central controller 1300. For example, a warning signal directed to the central controller 1300 may indicate that the RC 1310 has determined that a user has fallen in the first restroom 1302, or that a urinal's water level has risen to an unacceptable level, indicative of a blocked drain. On receiving a warning signal, an attendant at the central controller could then direct a maintenance crew to dispose of the problem. This system allows for rapid response to problems in bathrooms or restrooms.

The second restroom 1304 is provided with an RC 1312 in a manner similar to the first restroom 1302, and the first and second bathrooms 1306 and 1308 are provided with bathroom controllers 1314 and 1316 to control devices in the bathrooms, including toilets, wash basins, bathtubs and showers.

It will be appreciated that a number of safety features may be built into washroom, bathroom, and kitchen facilities to prevent injury and possible death of a user. In one particular example, a radar system may be used to detect the height of users of a whirlpool or bathtub, and set the level of water accordingly. The controller may be programmed to set the water level to a shallow value if a child or children are detected as users. Such control may optionally permit a deeper water level if a taller person, such as an adult is detected along with the child or children. Also, the temperature of water disposed by a faucet, or heated in the whirlpool, may be set according to whether a child or children are detected as being present. A radar system for a toilet may be adapted to detect when a child's head is lodged in the toilet and to take appropriate action, such as preventing flushing or emptying the toilet. Also, the radar unit for a bathtub or whirlpool may be arranged to detect when a user appears above the surface of the water, so that appropriate actions, such as the sounding of an alarm or draining of water, may be initiated when the user disappears below the surface of the water for greater than a selected time-out period. The radar controller can also detect whether the user has left the bathtub or whirlpool by the change in water level.

It will be appreciated that a number of the embodiments disclosed herein may be useful for long-term monitoring of the integrity bathroom, kitchen or whirlpool fixtures. For example, where the fixture is made of vitreous china, the radar system may be able to identify the appearance or growth of a crack. For example, in the embodiment of a fluid level sensor shown in FIG. 8A, cracks in the bathtub occurring in the vicinity of the waveguide 812 may alter the dielectric environment surrounding the waveguide 812, thus altering the signal detected by the UWB electronics. As another example, if the radar transmitter 1004, illustrated in FIG. 10A was positioned behind the toilet 1000, rather than in a wall above the toilet 1000, then the transmitted radar beam 1003 would pass through the toilet 1000. Any long-term change in background signal received by the receiver 1008 may then be indicative of the appearance or growth of cracks in the toilet 1000.

It will be appreciated that the invention described herein may be included as part of an integrated home electronic control network, alternately known as a "smart home" network, and that one or more bathroom controllers, or a central controller may be interfaced with, or form part of, a control network controller. For example, active sensors provided in a bathroom may detect whether a person has slipped and fallen in the bathroom. A warning may then be directed to an appropriate authority, such as a paramedic service through a telephone link. In another example, active sensors may detect when the homeowner's activity commences in the morning, and use this information to heat water, and may even turn on house or room heating, or turn on air conditioning where appropriate. Additionally, if the smart home system does not expect any bathroom activity, for example because the occupant is absent or asleep, then any activity taking place in the bathroom may be indicative of a burglary taking place, and the smart home system would be able to alert the police or a home security service to the burglary.

We claim:

1. A system for controlling a plumbing fixture, comprising:
    at least two sensors, each sensor including a receiver, wherein the at least two sensors comprise a multi-sensor array and each sensor in the multi-sensor array is oriented to detect objects within a respective detection zone;
    a controller coupled to receive detection signals from the sensors and to generate a control signal in response to the received detection signals, wherein the controller includes a memory to store background map information on stationary objects within the detection zones, and is adapted to subtract the background map information from detection signals received from the sensors; and
    an actuator coupled to receive the control signal from the controller and couplable to the plumbing fixture to act on the plumbing fixture.

2. A system as recited in claim 1, wherein at least one of the sensors is an active sensor.

3. A system as recited in claim 1, wherein one of the sensors is a radar-based sensor, the receiver including a receive antenna coupled to an RF signal detector, the RF signal detector generating the detection signals and the controller being coupled to the RF signal detector to receive the detection signals.

4. A system as recited in claim 3, wherein the radar-based sensor is non-monostatic, the sensor includes an RF generator coupled to a transmit antenna to radiate probe signals.

5. A system as recited in claim 3, wherein the radar-based sensor is monostatic and the receive antenna also includes a transmit antenna, the receive antenna being coupled to an RF signal generator to radiate RF probe signals.

6. A system as recited in claim 1, wherein the controller comprises at least part of the control system of an integrated home electronic control network.

7. A system as recited in claim 1, wherein the actuator is connected to a flushing valve of a first toilet and the controller is adapted to delay flushing of other toilets in response to a signal indicating that the first toilet is flushing.

8. A system as recited in claim 1, wherein the controller includes an analyzer coupled to receive fixture use information from one of the at least two sensors and to compare present use with expected use based on past usage patterns.

9. A system as recited in claim 1, wherein the actuator couplable to the plumbing fixture includes a valve to flush a toilet or a urinal.

10. A system for controlling a plumbing fixture, comprising:
    at least two sensors, each sensor including a receiver, wherein one of the at least two sensors includes a transmission line coupled to receive pulses from a pulse generator and coupled to a detector to detect pulses reflected within the transmission line, a portion of the transmission line having an impedance value variable in response to an effective environmental dielectric constant;
    a controller coupled to receive detection signals from the sensors and to generate a control signal in response to the received signals; and
    an actuator coupled to receive the control signal from the controller and couplable to the plumbing fixture to act on the plumbing fixture.

11. A system as recited in claim 10, wherein the controller is coupled to an alarm to warn a user of the plumbing fixture of abnormal operating conditions.

12. A system as recited in claim 10, wherein the controller is coupled to an alarm of a maintenance alarm system to warn a maintainer of the plumbing fixture of abnormal operating conditions.

13. A system as recited in claim 10, wherein one of the at least two sensors senses one of a) a user's distance from the plumbing fixture, b) a direction of a user's motion relative to the plumbing fixture and c) a depth of fluid in the plumbing fixture.

14. A system as recited in claim 10, wherein the at least two sensors comprise a multi-sensor array, wherein each sensor in the multi-sensor array is oriented to detect objects within a respective detection zone, and the sensors are coupled to the controller to transmit detection information thereto.

15. A system as recited in claim 14, wherein the controller is adapted to detect an object moving from one of the detection zones to another detection zone.

16. A system as recited in claim 14, wherein the multi-sensor array includes range-measuring sensors coupled to transmit range information to the controller, and the controller is adapted to determine an object height in a detection zone in response to the range information.

17. A system as recited in claim 14, further comprising a warning indicator coupled to the controller to receive warning information therefrom to present a warning to one of a user and maintenance personnel in response to the detection information.

18. A system as recited in claim 10, wherein one of the at least two sensors includes a sensor disposed with a toilet bowl and oriented to detect target matter in the toilet bowl.

19. A system as recited in claim 10, wherein one of the at least two sensors includes a fluid supply pressure sensor attached to a fluid supply and coupled to the central controller to transmit pressure signals thereto.

20. A system as recited in claim 1, wherein the actuator couplable to the plumbing, fixture includes a valve to permit water to flow through a faucet.

21. A method of controlling plumbing fixtures, comprising
detecting background signals from stationary objects within detection zones of a plurality of sensors;
receiving detection signals from the plurality of sensors in a central controller;
subtracting the background signals from the received detection signals to form object signals;
determining a position of a detected object from the object signals;
selecting, in the central controller, which of a plurality of actuators attachable to the plumbing fixtures to operate; and
directing control signals to the selected actuator to operate the selected actuator.

22. A method of controlling plumbing fixtures, comprising
receiving, in a central controller, detection signals from a plurality of sensors of a multi-sensor array;
detecting presence of a user within a detection zone of one of the sensors of the multi-sensor array;
determining a position of the user in response to a temporal sequence of detection signals received from the multi-sensor array;
selecting, in the central controller, which of a plurality of actuators attachable to the plumbing fixtures to operate; and
directing control signals to the selected actuator to operate the selected actuator.

23. A method as recited in claim 22, further comprising detecting a user's height and adjusting a height of one of the plumbing fixtures in response to the detected user's height.

24. A method as recited in claim 22, further comprising detecting a distance between a user and a plumbing fixture and controlling an actuator when the user is detected to be within a predetermined distance of the plumbing fixture.

25. A method as recited in claim 22, further comprising detecting the user moving from one detection zone to another detection zone.

26. A method as recited in claim 22, further comprising sensing a range between the user and one of the sensors of the plurality of sensors and determining a height of the user from the sensed range.

27. A method as recited in claim 22, further comprising recording temporal sequences of detection zones occupied by the user and of ranges between the multi-sensor array and the user and determining actions of the user from the recorded temporal sequences.

28. A method as recited in claim 22, further comprising determining that one of movement and position of the user is abnormal and warning one of a user and maintenance personnel in response to the determined abnormality.

29. A method as recited in claim 22, further comprising detecting a distance between a user and a plumbing fixture and controlling an actuator when the user is detected within a predetermined distance of the plumbing fixture for a predetermined length of time.

30. A method as recited in claim 22, wherein receiving detection signals from a plurality of sensors in a central controller includes detecting a fluid level in a plumbing fixture.

31. A method as recited in claim 30, wherein directing control signals to the selected actuator to operate the selected actuator includes controlling a fluid flow valve to control flow of fluid into the plumbing fixture in response to the detected fluid height.

32. A method as recited in claim 30, further comprising determining whether the detected fluid level lies outside a predetermined range and warning one of a plumbing fixture maintenance person and a user when the detected fluid level is determined to lie outside the predetermined range.

33. A method as recited in claim 22, further comprising determining whether a size of solid matter deposited by a user in a toilet bowl exceeds a predetermined acceptable size.

34. A method as recited in claim 33, further comprising warning one of maintenance personnel and the user that the solid matter exceeds the predetermined acceptable size.

35. A method as recited in claim 33, further comprising increasing a fluid flush volume for the toilet bowl when the size of solid matter exceeds the predetermined acceptable size.

36. A method as recited in claim 22, wherein the selected actuator is connected to a flushing valve for a first toilet and further comprising delaying flushing of other toilets when the first toilet flushes.

37. A method as recited in claim 22, further comprising monitoring a supply pressure of fluid supplied to the plumbing fixtures.

38. A method as recited ill claim 37, wherein directing control signals to the selected actuator to operate the selected actuator includes delaying directing a flushing control signal to one of a toilet and a urinal until the supply pressure increases from a value below a predetermined minimum value to above the predetermined minimum value.

39. A method as recited in claim 37, wherein directing control signals to the selected actuator to operate the selected actuator includes directing a control signal to activate the actuator for a period of time longer than a normal-operation period of time when it is determined that the supply pressure is less than a predetermined threshold value.

40. A method as recited in claim 22, further comprising detecting that fluid has pooled on a floor close to one of the plumbing fixtures and warning one of maintenance personnel and a user of the detected fluid pool.

41. A method as recited in claim 22, further comprising maintaining a history of past plumbing device usage for one or more of the plumbing devices, monitoring present frequency of use of the one or more plumbing devices and providing an indication to maintenance personnel when the present frequency of use indicates that the present frequency of use differs from an expected frequency of use obtained from the history of past plumbing device usage.

42. A method as recited in claim 22, wherein directing control signals to the selected actuator to operate the selected actuator includes activating a fluid flow valve, the fluid flow valve controlling flow of fluid therethrough upon activation.

43. A system for controlling plumbing fixtures, comprising:

means for receiving detection signals from a plurality of sensors of a multi-sensor array;

means for detecting presence of a user within a detection zone of one of the sensors of the multi-sensor array;

means for determining a position of the user in response to a temporal sequence of detection signals received from the multi-sensor array;

means for selecting which of a plurality of actuators attachable to the plumbing fixtures to operate; and means for directing control signals to the selected actuator to operate the selected actuator.

44. A system as recited in claim 43, wherein the means for directing control signals to the selected actuator to operate the selected actuator includes means for activating a fluid flow valve, the fluid flow valve controlling flow of fluid therethrough upon activation.

45. A system as recited in claim 43, further comprising means for detecting a distance between the user and a plumbing fixture and means for controlling an actuator when the user is detected to be within a predetermined distance of the plumbing fixture.

46. A system as recited in claim 43, further comprising means for detecting a distance between the user and a plumbing fixture and means for controlling an actuator when the user is detected to be remain within a predetermined distance of the plumbing fixture for a predetermined length of time.

47. A system as recited in claim 43, wherein the means for receiving detection signals from a plurality of sensors in a central controller includes means for detecting a fluid level in a plumbing fixture.

48. A system as recited in claim 43, further comprising means for detecting the user's height and means for adjusting a height of one of the plumbing fixtures in response to the detected user's height.

* * * * *